United States Patent
Kinpara et al.

(10) Patent No.: US 6,933,701 B2
(45) Date of Patent: Aug. 23, 2005

(54) CONTROL APPARATUS FOR SYNCHRONOUS MOTOR

(75) Inventors: Yoshihiko Kinpara, Tokyo (JP); Toshiyuki Kaitani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/924,965

(22) Filed: Aug. 25, 2004

(65) Prior Publication Data

US 2005/0024009 A1 Feb. 3, 2005

Related U.S. Application Data

(63) Continuation of application No. 10/275,483, filed as application No. PCT/JP01/03530 on Apr. 24, 2001, now Pat. No. 6,825,637.

(51) Int. Cl.[7] ............................. H02P 1/46; H02P 3/18; H02P 7/36
(52) U.S. Cl. ....................... 318/700; 318/138; 318/254; 318/439; 318/727; 318/731
(58) Field of Search .................. 318/800–811, 138, 318/254, 560, 439, 700–727, 731

(56) References Cited

U.S. PATENT DOCUMENTS

| | | | |
|---|---|---|---|
| 4,862,054 A | 8/1989 | Schauder | |
| 5,057,759 A | 10/1991 | Ueda et al. | |
| 5,296,793 A | 3/1994 | Lang | |
| 5,296,794 A | 3/1994 | Lang et al. | |
| 5,952,810 A | 9/1999 | Yamada et al. | |
| 6,081,093 A | 6/2000 | Oguro et al. | |
| 6,344,725 B2 | 2/2002 | Kaitani et al. | |
| 6,359,415 B1 | 3/2002 | Suzuki et al. | |
| 6,396,229 B1 | 5/2002 | Sakamoto et al. | |
| 6,414,462 B2 | 7/2002 | Chong | |
| 6,452,357 B1 | 9/2002 | Jahkonen | |
| 6,462,492 B1 | 10/2002 | Sakamoto et al. | |
| 6,646,409 B2 * | 11/2003 | Won et al. | 318/701 |
| 6,650,083 B2 * | 11/2003 | Jung | 318/701 |
| 6,657,413 B2 * | 12/2003 | Nakatsugawa et al. | 318/700 |

FOREIGN PATENT DOCUMENTS

| | | |
|---|---|---|
| EP | 1 303 035 | 4/2003 |
| JP | 1-122383 | 5/1989 |
| JP | 3-49588 | 3/1991 |
| JP | 3-49589 | 3/1991 |
| JP | 8-308286 | 11/1996 |
| JP | 9-191698 | 7/1997 |

OTHER PUBLICATIONS

Yang, Geng, et al., "Position and Speed Sensorless Control of Brush–Less DC Motor Based on an Adaptive Observer", T. IEE Japan, vol. 113–D, No. 5, (1993).

* cited by examiner

Primary Examiner—David Martin
Assistant Examiner—Tyrone Smith
(74) Attorney, Agent, or Firm—Leydig, Voit & Mayer, Ltd.

(57) ABSTRACT

In a control apparatus for a synchronous motor, a coordinate converter converts a detected current into a current on rotational biaxial coordinates (d-q axis). A current controller outputs a voltage command on the coordinates so that the current follows a current command on the coordinates. Another coordinate converter converts the voltage command into three-phase voltage commands. An adaptive observer calculates an angular frequency so that a q-axis component of an estimated rotor magnetic flux is zero. An inverter applies a voltage to the motor based on the voltage command.

2 Claims, 15 Drawing Sheets

CONTROL APPARATUS FOR SYNCHRONOUS MOTOR

TECHNICAL FIELD

The present invention relates to a control apparatus which controls a synchronous motor without using a position sensor.

BACKGROUND ART

In general, a position sensor such as encoder, a resolver, or a Hall element is required to control a synchronous motor. However, the position sensor is disadvantageously used in a control apparatus for a synchronous motor with respect to cost reliability of the sensor, cumbersome wiring, and the like. From this viewpoint, a method of controlling a synchronous motor without using a position sensor has been proposed.

For example, as a method of calculating a rotational position and a rotational speed of a synchronous motor based on a mechanical constant such as an inertia, an induced voltage coefficient determined from magnetic flux or the like, and electric constants such as inductance and resistance of the synchronous motor, inventions disclosed in U.S. Pat. Nos. 5,296,793, 5,296,794, Japanese Patent Application Laid-Open No. 03-049589, Japanese Application Laid-Open No. 03-049588, and the like are known.

As a method of calculating a rotational position and a rotational speed of a synchronous motor based on an induced voltage coefficient, which is a function of rotor magnetic flux and an electric constant, such as inductance and resistance of the synchronous motor, inventions disclosed in Japanese Patent Application Laid-Open No. 08-308286, Japanese Patent Application Laid-Open No. 09-191698, and the like are known.

However, even though these methods are used, a mechanical constant such as inertia is unknown, or controllability is deteriorated when degaussing of a magnet is caused by heat generation from an electric motor.

On the other hand, a control method which can solve the above problems without requiring an induced voltage coefficient which is function of a mechanical constant, such as inertia or rotor magnetic flux is proposed in, e.g., "Position and Speed Sensorless Control of Brush-Less DC Motor Based on an Adaptive Observer" The Journal of The Institute of Electrical Engineers of Japan Vol. D113, No. 5 (1993).

FIG. 15 shows a conventional control apparatus for a synchronous motor described in The Journal of The Institute of Electrical Engineers of Japan Vol. D113, No. 5. In this figure, reference numeral 1 denotes a synchronous motor, 2 denotes a current detector, 3 denotes an inverter, 4 denotes a current controller, 5 to 8 denote coordinate converters, 9 denotes an adaptive observer, and 10 denotes a rotational position computing unit.

The synchronous motor 1 has a permanent magnet as a rotor which has a rotor magnetic flux of pdr. An inductance Ld in the direction of the rotor magnetic flux (d-axis direction) is equal to an inductance Lq in a direction (q-axis direction) perpendicular to the direction of the rotor magnetic flux. These inductances are L each. A wire wound resistance of the synchronous motor 1 is R.

As is well known, when a synchronous motor is vector-controlled, an arbitrary value has been given as a d-axis current command id* on a rotational biaxial coordinate axis (d-q axis) in advance. As a q-axis current command iq* on the rotational biaxial coordinate axis (d-q axis), a value which is in proportional to a desired torque of the synchronous motor 1 has been given in advance.

The current controller 4 outputs a d-axis voltage command vd* and a q-axis voltage command vq* on the rotational biaxial coordinate axis (d-q axis) such that detection currents id and iq on the rotational biaxial coordinate axis (d-q axis) rotated in synchronism with a rotational position output from the rotational position computing unit 10 follow the d-axis current command id* and the q-axis current command iq*, respectively.

The coordinate converter 5 coordinate-converts the d-axis voltage command vd* and the q-axis voltage command vq* on the rotational biaxial coordinate axis (d-q axis) into an a-axis voltage command va* and a b-axis voltage command vb* on static biaxial coordinates (a-b axis) based on a cosine cos (th0) and a sine sin (th0) obtained from the rotational position computing unit 10.

The coordinate converter 6 coordinate-converts the a-axis voltage command va* and the b-axis voltage command vb* on the static biaxial coordinates (a-b axis) into three-phase voltage commands vu*, vv* and vw*. The inverter 3 applies three-phase voltages to the synchronous motor 1 in accordance with the three-phase voltage commands vu*, vv* and vw* obtained from the coordinate converter 8.

The current detectors 2 detect a U-phase current iu and a V-phase current iv of the synchronous motor 1. The coordinate converter 7 coordinate-converts the U-phase current iu and the V-phase current iv obtained from the current detectors 2 into an a-axis current ia and a b-axis current ib on the static biaxial coordinates (a-b axis).

The coordinate converter 8 outputs the a-axis current ia and the b-axis current ib on the static biaxial coordinates (a-b axis) and a d-axis current command id and a q-axis current command iq on the rotational biaxial coordinate axis (d-q axis) based on a cosine cos (th0) and a sine sin(th0) obtained from the rotational position computing unit 10.

The adaptive observer 9 outputs an a-axis estimated rotor magnetic flux par0 and a b-axis estimated rotor magnetic flux pbr0 on the static biaxial coordinates (a-b axis) and an estimated rotational speed wr0 based on the a-axis voltage command va* and the b-axis voltage command vb* on the static biaxial coordinates (a-b axis) and the a-axis current ia and the b-axis current ib on the static biaxial coordinates (a-b axis).

The rotational position computing unit 10 calculates the cosine cos (th0) and the sine sin (th0) of a rotational position th0 of an estimated magnetic flux vector from the a-axis estimated rotor magnetic flux par0 and the b-axis estimated rotor magnetic flux pbr0 on the static biaxial coordinates (a-b axis) according to the following equations (1) to (3), $$\cos(th0) = \frac{par0}{pr0} \quad (1)$$

$$\sin(th0) = \frac{pbr0}{pr0} \quad (2)$$

$$pr0 = \sqrt{par0^2 + pbr0^2} \quad (3)$$

FIG. 16 is a diagram which shows the internal configuration of the adaptive observer 9 shown in FIG. 15. In this figure, reference numeral 11 denotes an electric motor model, 12 and 13 denotes subtractors, 14 denotes a speed identifier, 15 denotes a gain computing unit, and 16 denotes a deviation amplifier.

The electric motor model 11 calculates an a-axis estimated current ia0 and a b-axis estimated current ib0 on the static biaxial coordinates (a-b axis) and the a-axis estimated rotor magnetic flux par0 and the b-axis estimated rotor magnetic flux pbr0 based on the a-axis voltage command va* and the b-axis voltage command vb* on the static biaxial coordinates (a-b axis), the estimated rotational speed wr0, and deviations e1, e2, e3, and e4 (to be described later) according to the following equation (4), $$\frac{d}{dt}\begin{pmatrix} ia0 \\ ib0 \\ par0 \\ pbr0 \end{pmatrix} = \begin{pmatrix} -\frac{R}{L} & 0 & 0 & \frac{wr0}{L} \\ 0 & -\frac{R}{L} & -\frac{wr0}{L} & 0 \\ 0 & 0 & 0 & -wr0 \\ 0 & 0 & wr0 & 0 \end{pmatrix} \begin{pmatrix} ia0 \\ ib0 \\ par0 \\ pbr0 \end{pmatrix} + \begin{pmatrix} \frac{1}{L} & 0 \\ 0 & \frac{1}{L} \\ 0 & 0 \\ 0 & 0 \end{pmatrix} \begin{pmatrix} va^* \\ vb^* \end{pmatrix} - \begin{pmatrix} e1 \\ e2 \\ e3 \\ e4 \end{pmatrix} \quad (4)$$

The subtractor 12 outputs a result obtained by subtracting the a-axis current ia from the a-axis estimated current ia0 as an a-axis current deviation ea. The subtractor 13 outputs a result obtained by subtracting the b-axis current ib from the b-axis estimated current ib0 as a b-axis current deviation eb.

The speed identifier 14 outputs the estimated rotational speed wr0 based on the Par0, pbr0, ea, and eb according to the following equation (5), $$wr0 = \left(kp + \frac{ki}{s}\right)(ea \cdot pbr0 - eb \cdot par0) \quad (5)$$

The gain computing unit 15 outputs gains g1, g2, g3, and g4 based on the estimated rotational speed wr0 according to the following equations (6) to (9), $$g1 = -(k-1)\frac{R}{L} \quad (6)$$

$$g2 = (k-1)wr0 \quad (7)$$

$$g3 = kR \quad (8)$$

$$g4 = -kLwr0 \quad (9)$$

where k is an arbitrary real number larger than 1.

The deviation amplifier 16 amplifies the current deviations ea and eb by the gains g1, g2, g3, and g4 to output the deviations e1, e2, e3, and e4. More specifically, the deviation amplifier 16 outputs the deviations e1, e2, e3, and e4 to the electric motor model 11 according to the following equation (10), $$\begin{pmatrix} e1 \\ e2 \\ e3 \\ e4 \end{pmatrix} = \begin{pmatrix} g1 & -g2 \\ g2 & g1 \\ g3 & -g4 \\ g4 & g3 \end{pmatrix} \begin{pmatrix} ea \\ eb \end{pmatrix} \quad (10)$$

With the configuration described above, the adaptive observer 9 outputs the estimated rotor magnetic fluxes par0 and pbr0 and the estimated rotational speed wr0.

In the conventional control apparatus for a synchronous motor, the frequency components of the voltages va* and vb* input to the adaptive observer become high when the synchronous motor operates at a high rotational speed because the adaptive observer is constituted on the two static axes. Therefore, when the calculation of the adaptive observer is realized by a computer, sampling of the voltages va* and vb* must be performed at a very short cycle to drive the synchronous motor at a high rotational speed.

The conventional control apparatus for a synchronous motor cannot be easily applied to a synchronous motor in which an inductance Ld in the direction (d-axis direction) of a rotor magnetic flux is not equal to an inductance. Lq in the direction (q-axis direction) perpendicular to the direction of the rotor magnetic flux, i.e., a synchronous motor in which a salient-pole ratio is not 1. In the synchronous motor in which the salient-pole ratio is not 1, an inductance on static biaxial coordinates changes depending on the position of a rotor.

The conventional control apparatus for a synchronous motor constitutes an adaptive observer on static biaxial coordinates and cannot handle an inductance as a constant value. For this reason, the control apparatus cannot be easily applied to the synchronous motor.

In the conventional control apparatus for a synchronous motor, gains g1, g2, g3, and g4 are determined such that the pole of the adaptive observer is in proportion to the pole of the synchronous motor. However, when the synchronous motor is driven at a low rotational speed, the pole of the adaptive observer decreases because the pole of the synchronous motor is small. Therefore, the response of an estimated magnetic flux is deteriorated, the characteristics of the control system itself is also deteriorated.

The feedback gains g1, g2, g3, and g4 are set such that the pole of the adaptive observer 9 is in proportion to the unique pole of the synchronous motor 1. However, when an estimated rotational speed deviates from an actual rotational speed, these gains are not appropriate to perform state estimation. For this reason, the actual rotational speed wr deviates from the estimated rotational speed wr0, and thereby the accuracy of magnetic flux estimation is deteriorated.

Therefore, it is an object of the present invention to provide a control apparatus for a synchronous motor which can constitute an adaptive observer on rotational two axes and can control the synchronous motor at a high rotational speed.

DISCLOSURE OF THE INVENTION

The control apparatus for a synchronous motor according to the present invention comprises a current detector which detects a current of a synchronous motor, a coordinate converter which coordinate-converts the current obtained from the current detector into a current on rotational biaxial coordinates (d-q axis) rotated at an angular frequency, a current controller which outputs a voltage command on the rotational biaxial coordinates (d-q axis) such that a current on the rotational biaxial coordinates (d-q axis) follows a current command on the rotational biaxial coordinates (d-q axis), a coordinate converter which coordinate-converts the voltage command on the rotational biaxial coordinates (d-q axis) obtained from the current controller into three-phase voltage commands, an adaptive observer which calculates the angular frequency, an estimated current of the synchronous motor, an estimated rotor magnetic flux, and an estimated rotational speed based on the current on the rotational biaxial coordinates (d-q axis) and the voltage command on the rotational biaxial coordinates (d-q axis), and an inverter which applies a voltage to the synchronous motor based on the voltage command. The adaptive observer calculates the angular frequency such that a q-axis component of the estimated rotor magnetic flux is zero.

According to this invention, since the adaptive observer calculates the angular frequency such that the q-axis component of the estimated rotor magnetic flux is zero, the adaptive observer can be constituted on the rotational two axes.

In the control apparatus for a synchronous motor according to the next invention based on the above invention, the adaptive observer has an electric motor model in which a salient-pole ratio is not 1.

According to this invention, since the adaptive observer has the electric motor model in which the salient-pole ratio is not 1, the synchronous motor can be controlled at a high rotational speed even by an inexpensive computing unit, and the scope of application can be expanded to a synchronous motor having salient-pole properties.

In the control apparatus for a synchronous motor according to the next invention based on the above invention, the adaptive observer has a feedback gain which is given by a function of the estimated rotational speed such that transmission characteristics from a rotational speed error of the synchronous motor to an estimated magnetic flux error are averaged in a frequency area.

According to this invention, since the adaptive observer has the feedback gain which is given by the function of the estimated rotational speed such that the transmission characteristics from the rotational speed error of the synchronous motor to the estimated magnetic flux error are averaged in the frequency area, the pole of the synchronous motor can be arbitrary set even if the synchronous motor is driven at a low rotational speed, and the synchronous motor can be stably controlled without deteriorating the accuracy of magnetic flux estimation.

In the control apparatus for a synchronous motor according to the next invention based on the above invention, the adaptive observer calculates an estimated rotational speed based on a q-axis component of a deviation between a current on the rotational biaxial coordinates (d-q axis) and the estimated current.

According to this invention, since the estimated rotational speed can be calculated based on the q-axis component of the deviation between the current on the rotational biaxial coordinates (d-q axis) and the estimated current, the number of times of multiplication and division required for calculation can be reduced by omitting a product between the q-axis component of the deviation between the current and the estimated current and an estimated rotor magnetic flux, and a calculation time can be shortened.

In the control apparatus for a synchronous motor according to the next invention based on the above invention, the adaptive observer calculates an estimated rotational speed based on a value obtained by dividing the q-axis component of the deviation between the current on the rotational biaxial coordinates (d-q axis) and the estimated current by the estimated rotor magnetic flux.

According to this invention, since the estimated rotational speed is calculated based on the value obtained by dividing the q-axis component of the deviation between the current on the rotational biaxial coordinates (d-q axis) and the estimated current by the estimated rotor magnetic flux, even though the rotor magnetic flux changes depending on a temperature, an estimated response of the rotational speed can be kept constant.

The control apparatus for a synchronous motor according to the next invention based on the above invention, includes a speed controller which outputs a current command on the rotational biaxial coordinates (d-q axis) such that the current command is equal to a rotational speed command based on at least one value of an estimated rotational speed obtained from the adaptive observer and the angular frequency.

According to this invention, since the speed controller which provides the current command on the rotational biaxial coordinates (d-q axis) such that the current command is equal to the rotational speed command based on at least one value of the estimated rotational speed obtained from the adaptive observer and the angular frequency is arranged, the synchronous motor can-be controlled in speed.

BEST MODE FOR CARRYING OUT THE INVENTION

Figure 1:
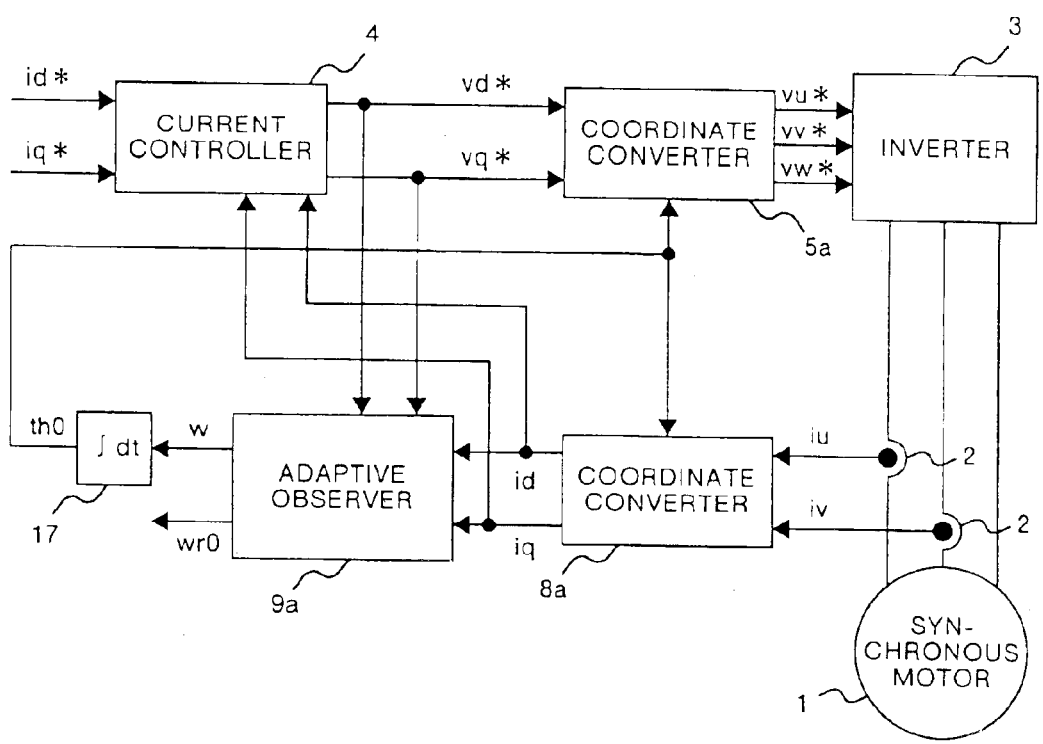
FIG. 1 is a block diagram which shows the configuration of a control apparatus for a synchronous motor according to a first embodiment of the present invention.

Preferred embodiments of a receiver according to this invention will be explained below with reference to the accompanying drawings.

First Embodiment:

Derivation of an adaptive observer used in the present invention will be explained below. When electric motor models expressed by equations (4), (5), and (10) are converted into rotational biaxial coordinates (d-q axis) rotated at an arbitrary angular frequency w, the following equations (11) to (13) are obtained.

$$\frac{d}{dt}\begin{pmatrix} id0 \\ iq0 \\ pdr0 \\ pqr0 \end{pmatrix} = \begin{pmatrix} -\frac{R}{L} & w & 0 & \frac{wr0}{L} \\ -w & -\frac{R}{L} & -\frac{wr0}{L} & 0 \\ 0 & 0 & 0 & w-wr0 \\ 0 & 0 & -w+wr0 & 0 \end{pmatrix} \begin{pmatrix} id0 \\ iq0 \\ pdr0 \\ pqr0 \end{pmatrix} + \begin{pmatrix} \frac{1}{L} & 0 \\ 0 & \frac{1}{L} \\ 0 & 0 \\ 0 & 0 \end{pmatrix} \begin{pmatrix} vd^* \\ vq^* \end{pmatrix} - \begin{pmatrix} e1 \\ e2 \\ e3 \\ e4 \end{pmatrix} \quad (11)$$

$$wr0 = \left(kp + \frac{ki}{s}\right)(ed \cdot pqr0 - eq \cdot pdr0) \quad (12)$$

$$\begin{pmatrix} e1 \\ e2 \\ e3 \\ e4 \end{pmatrix} = \begin{pmatrix} g1 & -g2 \\ g2 & g1 \\ g3 & -g4 \\ g4 & g3 \end{pmatrix} \begin{pmatrix} ed \\ eq \end{pmatrix} \quad (13)$$

The equations (11) to (13) are satisfied on the rotational biaxial coordinate axis rotated at the arbitrary angular frequency w. Therefore, obviously these equations are also satisfied on the rotational biaxial coordinate axis rotated at the angular frequency w given by the following equation (14), $$w = wr0 - \frac{e4}{pdr0} \quad (14)$$

Calculation of the angular frequency w given by the equation (14) corresponds to calculation in which the angular frequency w is calculated such that a q-axis component of an estimated rotor magnetic flux is zero. Therefore, in this embodiment, the rotational biaxial coordinate axis rotated at the angular frequency w given by the equation (14) is defined as a d-q axis.

When the equation (14) is substituted to the fourth line of the equation (11), the following equation (15) is obtained.

$$\frac{d}{dt}pqr0 = 0 \quad (15)$$

In the present invention, the direction of an estimated rotor magnetic flux vector is made equal to the direction of the d-axis. At this time, since the following equation (16) is established, when the equations (15) and (16) are substituted to the equations (11) and (12), the following equations (17) and (18) are obtained, $$pqr0 = 0 \quad (16)$$

$$\frac{d}{dt}\begin{pmatrix} id0 \\ iq0 \\ pdr0 \end{pmatrix} = \begin{pmatrix} -\frac{R}{L} & w & 0 \\ -w & -\frac{R}{L} & -\frac{wr0}{L} \\ 0 & 0 & 0 \end{pmatrix} \begin{pmatrix} id0 \\ iq0 \\ pdr0 \end{pmatrix} + \begin{pmatrix} \frac{1}{L} & 0 \\ 0 & \frac{1}{L} \\ 0 & 0 \end{pmatrix} \begin{pmatrix} vd^* \\ vq^* \end{pmatrix} - \begin{pmatrix} e1 \\ e2 \\ e3 \end{pmatrix} \quad (17)$$

$$wr0 = \left(kp + \frac{ki}{s}\right)(eq \cdot pdr0) \quad (18)$$

Therefore, when the same calculation as that of the conventional adaptive observer constituted by the equations (4) to (10) is performed based on the equations (13), (14), (17), and (18), the calculation can be performed on the rotational biaxial coordinate axis.

The voltage commands va* and vb* on the static biaxial coordinates input to the conventional adaptive observer are AC. However, voltage commands vd* and vq* input to the adaptive observer constituted by the equations (13), (14), (17), and (18) are DC quantities because the voltage commands vd* and vq* are variables on the rotational biaxial coordinate axis.

Therefore, when the calculation of the conventional adaptive observer is realized by a computing unit, sampling of the voltages va* and vb* must be performed at a very short cycle to drive the synchronous motor at a high rotational speed. However, the adaptive observer constituted by the equations (13), (14), (17), and (18) can solve this problem because the voltage commands vd* and vq* are DC quantities.

The configuration of the control apparatus for a synchronous motor according to the first embodiment will be explained below. FIG. 1 is a diagram which shows the configuration of the control apparatus for a synchronous motor according to the first embodiment. In FIG. 1, reference numerals 1, 2, 3, and 4 denote the same parts in the conventional apparatus, and an explanation thereof will be omitted. Reference numerals 5a and 8a denote coordinate converters, reference numeral 9a denotes an adaptive observer, and 17 denotes an integrator.

The coordinate converter 5a coordinate-converts a d-axis voltage command vd* and a q-axis voltage command vq* on the rotational biaxial coordinate axis (d-q axis) into three-phase voltage commands vu* vv*, and vw* based on a rotational position th0 obtained from the integrator 17.

The coordinate converters 8a convert coordinates of a U-phase current iu and a V-phase current iv obtained from the current detectors 2 into a d-axis current id and a q-axis current iq or the rotational position th0 obtained from the integrator 17 and outputs the currents id and iq.

The adaptive observer 9a outputs an estimated rotor magnetic flux pdr0, the angular frequency w, and an estimated rotational speed wr0 based on the d-axis voltage command vd* and the q-axis voltage command vq* on the rotational biaxial coordinate axis (d-q axis) and the d-axis current command id and the q-axis current command iq on the rotational biaxial coordinate axis (d-q axis).

The integrator 17 integrates the angular frequency w obtained from the adaptive observer 9a to output the rotational position th0.

Figure 2:
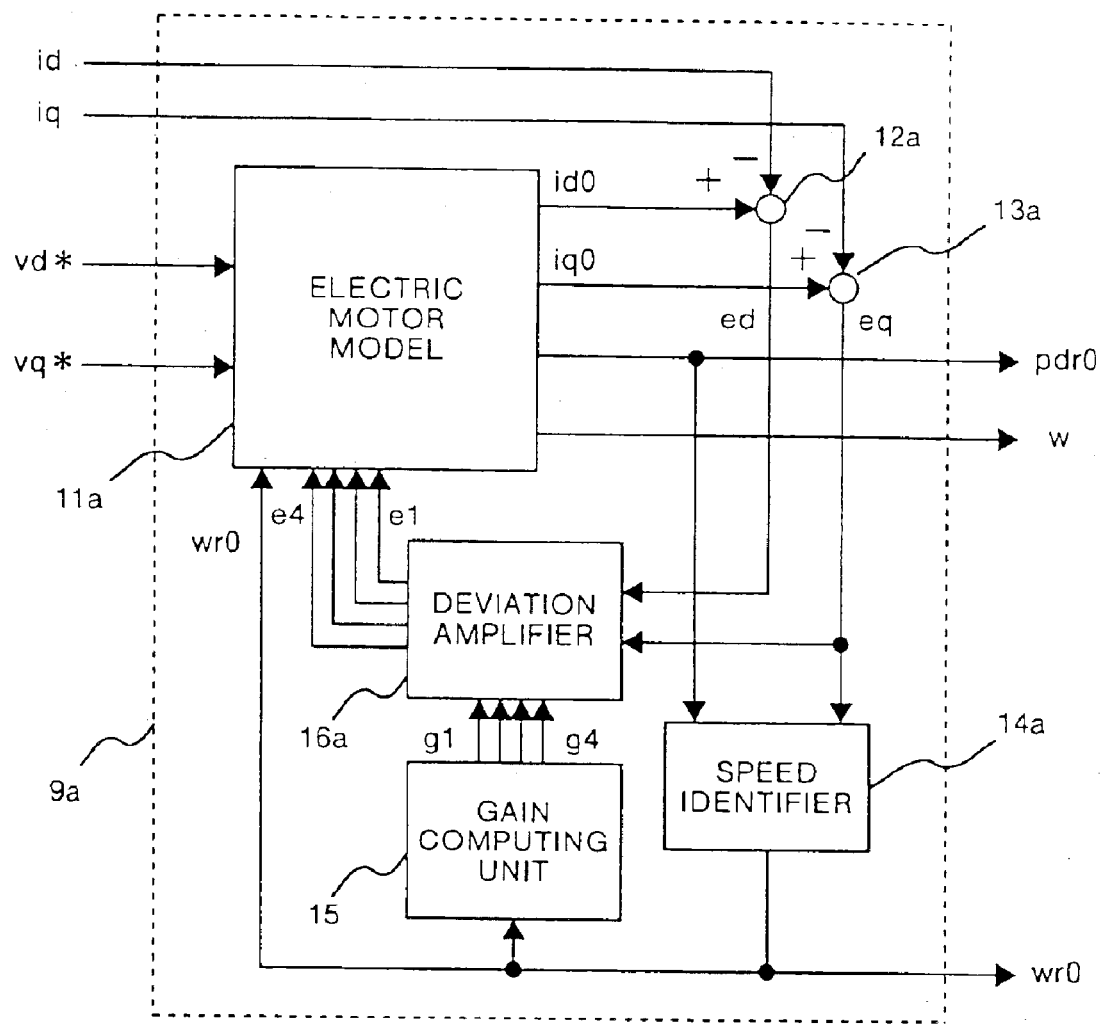
FIG. 2 is a block diagram which shows the configuration of an adaptive observer according to the first embodiment.

FIG. 2 is a diagram which shows the internal configuration of the adaptive observer 9a. In this figure, reference numeral 15 denotes the same part in the conventional apparatus, and an explanation thereof will be omitted. Reference numeral 11a denotes an electric motor model, 12a and 13a denote subtractors, 14a denotes a speed identifier, and 16a denotes a deviation amplifier.

The electric motor model 11a calculates a d-axis estimated current id0 and a q-axis estimated current iq0 on the rotational biaxial coordinates (d-q axis), the estimated rotor magnetic flux pdr0, and the angular frequency w according to equations (14) and (17) based on the d-axis voltage command vd* and the q-axis voltage command vq* on the rotational biaxial coordinates (d-q axis), the estimated rotor speed wr0, and deviations e1, e2, e3, and e4 (to be described later).

The subtractor 12a outputs a result obtained by subtracting the d-axis current id from the d-axis estimated current id0 as ad-axis current deviationed. The subtractor 13a outputs a result obtained by subtracting the q-axis current iq from the q-axis estimated current iq0 as a q-axis current deviation eq.

The speed identifier 14a outputs the estimated rotational speed wr0 according to equation (18) based on the currents pdr0 and eq. The gain computing unit 15 outputs gains g1, g2, g3, and g4 according to equations (6) to (9) based on the estimated rotational speed wr0.

The deviation amplifier 16a amplifies the current deviations ed and eq by the gains g1, g2, g3, and g4 to output the deviations e1, e2, e3, and e4. More specifically, the deviation amplifier 16a outputs the deviations e1, e2, e3, and e4 to the electric motor model 11a according to the equation (13).

With the above configuration, the adaptive observer 9a outputs the estimated rotor magnetic flux pdr0, the angular frequency w, and the estimated rotational speed wr0.

Figure 3:
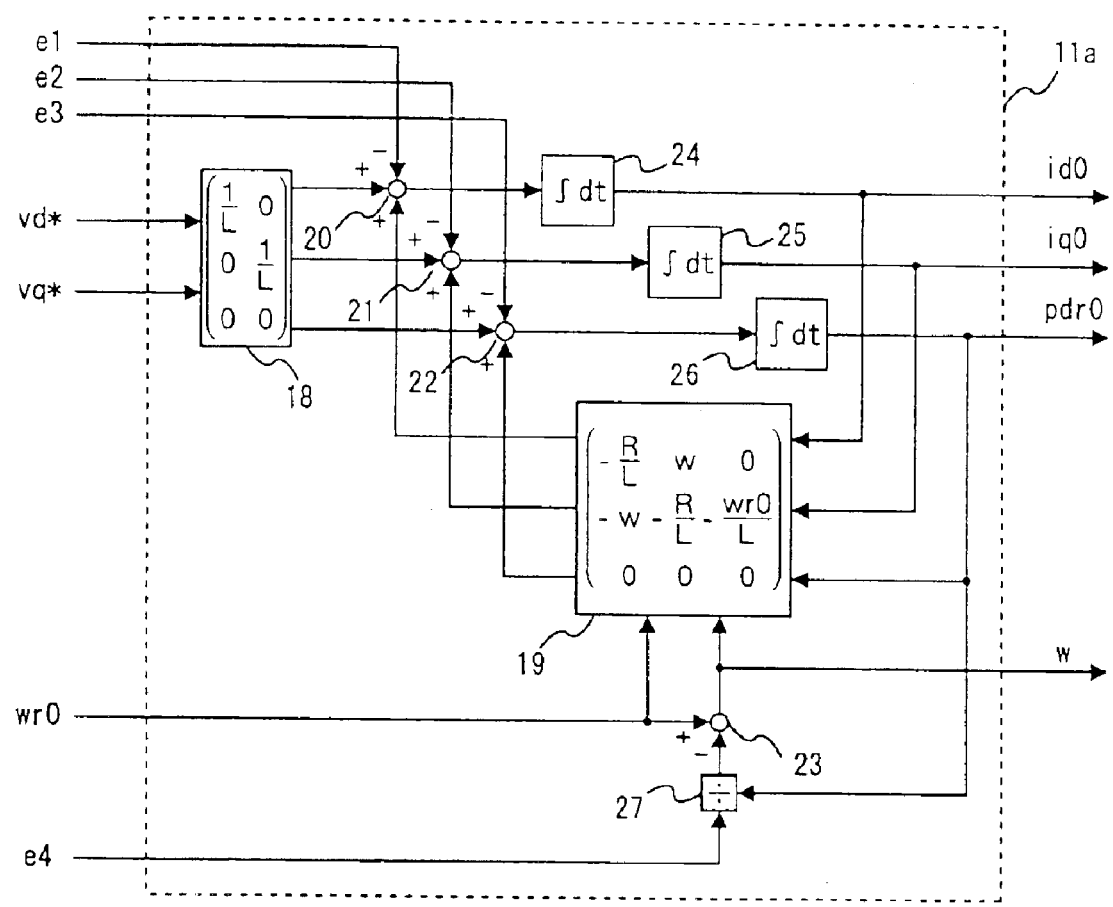
FIG. 3 is a diagram which shows the configuration of an electric motor model.

FIG. 3 is a diagram which shows the configuration of the electric motor model 11a. In this figure, reference numerals 18 and 19 denote matrix gains, 20 to 23 denote adder-subtractors, 24 to 26 denote integrators, and 27 denote a divider.

The matrix gain 18 outputs a calculation result of the second term of the right side of the equation (17) based on the input voltage commands vd* and vq*. The matrix gain 19 outputs a calculation result of the first term of the right side of the equation (17) based on the input angular frequency w, the input estimated rotational speed wr0, the input estimated currents iq0 and iq0, and the input estimated rotor magnetic flux pdr0.

The adder-subtractors 20 to 22 add and subtract the first term, the second term, and the third term of the right side of the equation (17) to output d/dt id0, d/dt iq0, and d/dt pdr0, respectively. The integrator 24 outputs id0 by integrating the d/dt id0. The integrator 25 outputs iq0 by integrating the d/dt iq0. The integrator 26 outputs pdr0 by integrating the d/dt pdr0.

The divider 27 outputs a calculation result of the second term of the right side of the equation (14) based on the input e4 and pdr0. The subtractor 23 subtracts an output from the divider 27 from the estimated rotational speed wr0 to output the right side of the equation (14), i.e., the angular frequency w.

With the above configuration, the electric motor model 9a calculates the d-axis estimated current id0 and the q-axis estimated current iq0 on the rotational biaxial coordinates (d-q axis), the estimated rotor magnetic flux pdr0, and the angular frequency w according to the equations (14) and (17).

According to this embodiment, the adaptive observer is constituted on the rotational two axes, and therefore even though the synchronous motor operates at a high rotational speed, the frequency components of the voltages vd* and vq* input to the adaptive observer are DC components. For this reason, even though calculation of the adaptive observer is realized by a computing unit, sampling of the voltages vd* and vq* need not be performed at a very short cycle. Therefore, even though an inexpensive computing unit is used, the synchronous motor can be controlled at a high rotational speed.

Second Embodiment:

In the first embodiment, the apparatus can be applied to a synchronous motor the inductance of which has no salient-pole properties. However, the apparatus cannot be directly applied to the synchronous motor which has salient-pole properties without any change to the apparatus. Therefore, in the second embodiment, a control apparatus for a synchronous motor which can be applied to a synchronous motor which has salient-pole properties will be explained.

As is well known, in the synchronous motor having salient-pole properties, an inductance in the direction of the rotor magnetic flux is different from an inductance in the direction perpendicular to the direction of the rotor magnetic flux, and therefore the inductance in the direction of the rotor magnetic flux is defined as Ld, and the inductance in the direction perpendicular to the direction of the rotor magnetic flux is defined as Lq in the following description.

In general, it is known that the following equation (19) holds on the rotational biaxial coordinates (d-q axis) having a d-axis which is rotated in synchronism with the direction of the rotor magnetic flux, $$\frac{d}{dt}\begin{pmatrix} id \\ iq \\ pdr0 \end{pmatrix} = \begin{pmatrix} -\frac{R}{Ld} & \frac{Lq}{Ld}w & 0 \\ -\frac{Ld}{Lq}w & -\frac{R}{Lq} & -\frac{wr}{Lq} \\ 0 & 0 & 0 \end{pmatrix}\begin{pmatrix} id \\ iq \\ pdr \end{pmatrix} + \begin{pmatrix} \frac{1}{Ld} & 0 \\ 0 & \frac{1}{Lq} \\ 0 & 0 \end{pmatrix}\begin{pmatrix} vd \\ vq \end{pmatrix} \quad (19)$$

Therefore, when the elements of the equations (17) and (19) are compared with each other, based on an adaptive observer related to a synchronous motor having salient-pole properties, the following equations (20), (21), and (22) can be derived, $$\frac{d}{dt}\begin{pmatrix} id0 \\ iq0 \\ pdr0 \end{pmatrix} = \begin{pmatrix} -\frac{R}{Ld} & \frac{Lq}{Ld}w & 0 \\ -\frac{Ld}{Lq}w & -\frac{R}{Lq} & -\frac{wr0}{Lq} \\ 0 & 0 & 0 \end{pmatrix}\begin{pmatrix} id0 \\ iq0 \\ pdr0 \end{pmatrix} + \begin{pmatrix} \frac{1}{Ld} & 0 \\ 0 & \frac{1}{Lq} \\ 0 & 0 \end{pmatrix}\begin{pmatrix} vd* \\ vq* \end{pmatrix} - \begin{pmatrix} e01 \\ e02 \\ e03 \end{pmatrix} \quad (20)$$

$$w = wr0 - \frac{e04}{pdr0} \quad (21)$$

-continued $$\begin{pmatrix} e01 \\ e02 \\ e03 \\ e04 \end{pmatrix} = \begin{pmatrix} g11 & g12 \\ g21 & g22 \\ g31 & g32 \\ g41 & g42 \end{pmatrix} \begin{pmatrix} ed \\ eq \end{pmatrix} \quad (22)$$

Although feedback gains are constituted by the four types of elements g1 to g4 in the equation (13, the coefficients of the equation (21) constitute feedback gains with reference to eight types of elements g11 to g41 obtained in consideration of a salient-pole ratio, e.g., the following equations (23) to (30).

$$g11 = -(k-1)\frac{R}{Ld} \quad (23)$$

$$g12 = -(k-1)\frac{Ld}{Lq}wr0 \quad (24)$$

$$g21 = (k-1)\frac{Lq}{Ld}wr0 \quad (25)$$

$$g22 = -(k-1)\frac{R}{Lq} \quad (26)$$

g31=kR  (27)

g32=kLqwr0  (28)

g41=−kLdwr0  (29)

g42=kR  (30)

The configuration of the second embodiment merely uses a synchronous motor 1b in place of the synchronous motor 1 and uses an adaptive observer 9b in place of the adaptive observer 9a in FIG. 1 (not shown).

The synchronous motor 1b has a permanent magnet as a rotor the rotor magnetic flux of which is pdr. The inductance in the direction (d-axis direction) of the rotor magnetic flux is Ld, and the inductance in the direction (q-axis direction) perpendicular to the direction of the rotor magnetic flux is Lq.

Figure 4:
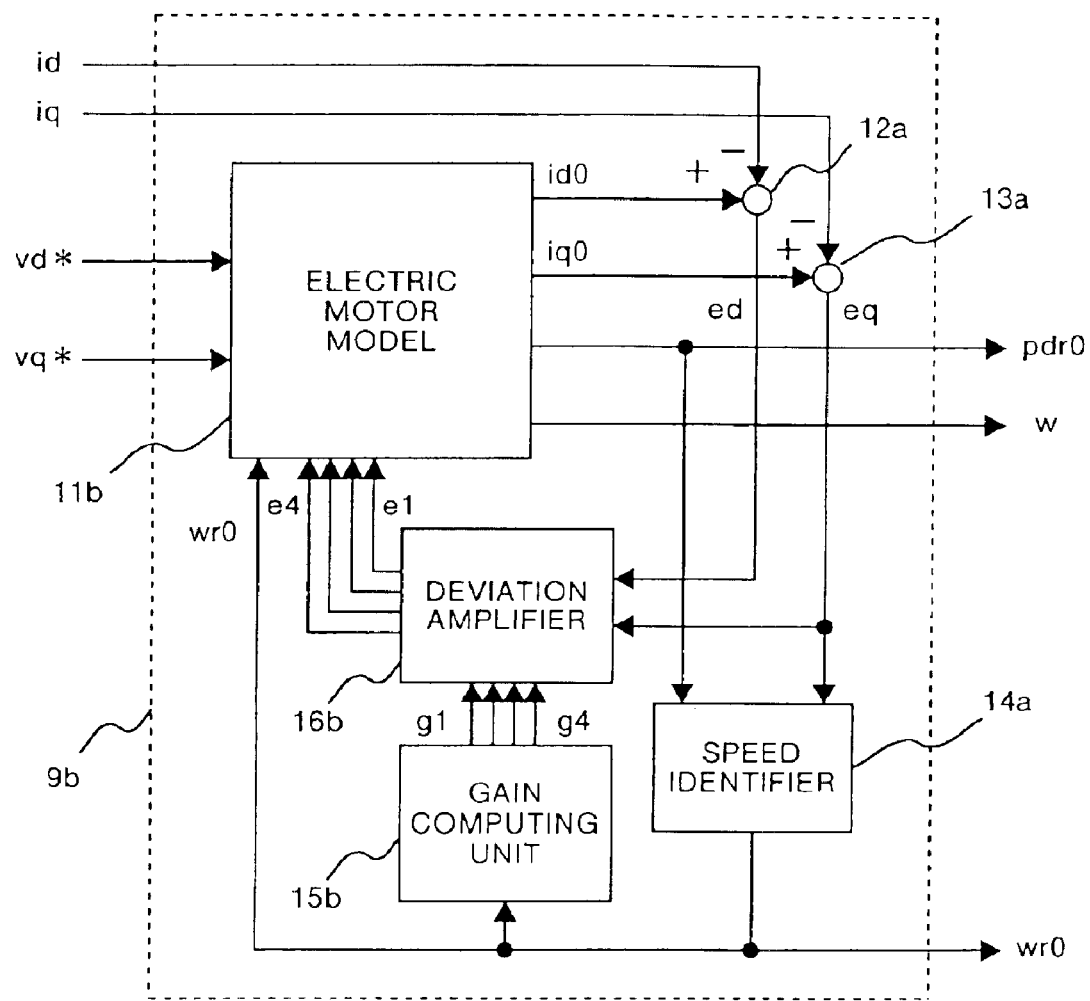
FIG. 4 is a diagram which shows the configuration of an adaptive observer.

FIG. 4 is a diagram which shows the configuration of the adaptive observer 9b. In this figure, reference numerals 12a, 13a, and 14a denote the same parts in the first embodiment, and an explanation thereof will be omitted. Reference numeral 11b denotes an electric motor model, 15b denotes a gain computing unit, and 16b denotes a deviation amplifier.

The electric motor model 11b calculates a d-axis estimated current id0 and a q-axis estimated current iq0 on the rotational biaxial coordinates (d-q axis), a d-axis estimated rotor magnetic flux pdr0, and an angular frequency w according to the equations (20) and (21) based on the d-axis voltage command vd* and the q-axis voltage command vq* on the rotational biaxial coordinates (d-q axis) ,the estimated rotational speed wr0, and deviations e1, e2, e3, and e4 (to be described later).

The gain computing unit 15b outputs gains g11, g12, g21, g22, g31, g32, g41, and g42 according to the equations (23) to (30) based on the estimated rotational speed wr0. The deviation amplifier 16b amplifies the current deviations ed and eq by the gains g11, g12, g21, g22, g31, g32, g41, and g42 to output deviations e01, e02, e03, and e04. More specifically, the deviation amplifier 16b outputs the deviations e01, e02, e03, and e04 to the electric motor model 11b according to the equation (22).

With the above configuration, the adaptive observer 9b outputs the estimated rotor magnetic flux pdr0, the angular frequency w, and the estimated rotational speed wr0.

Figure 5:
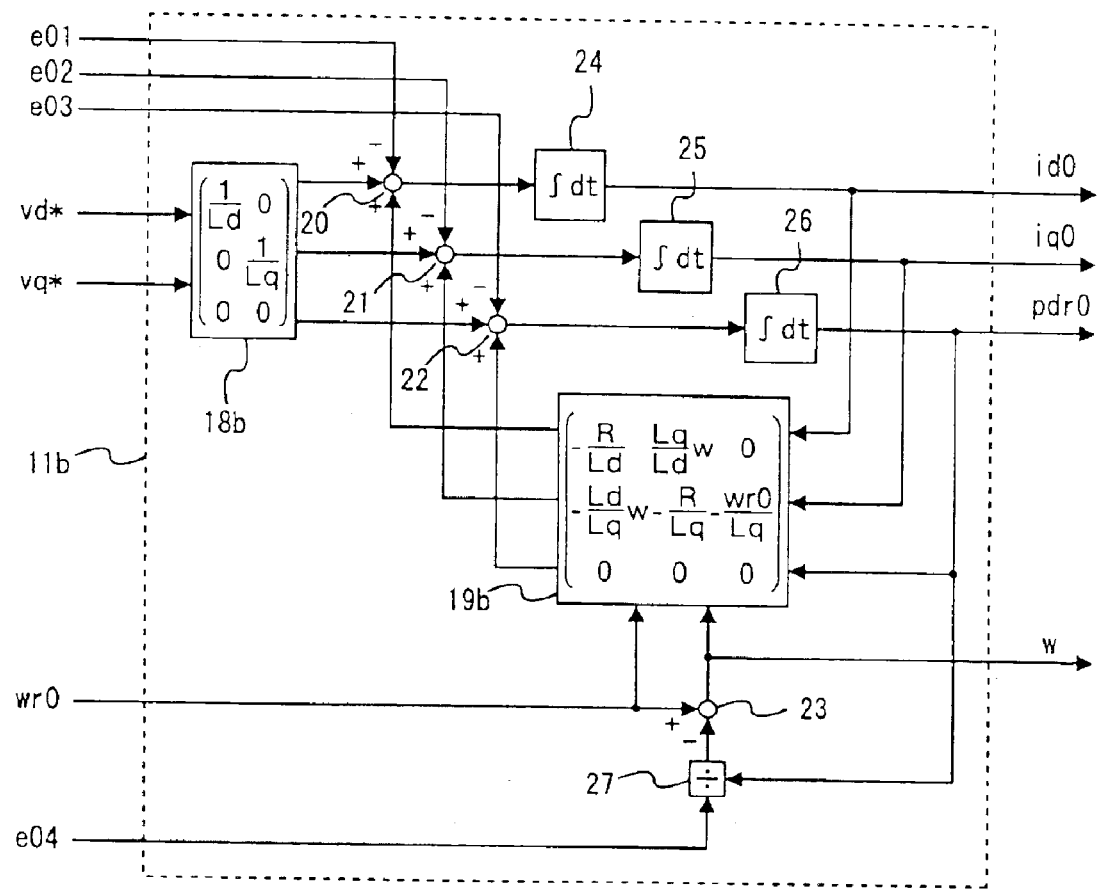
FIG. 5 is a diagram which shows the configuration of an electric motor model.

FIG. 5 is a diagram which shows the configuration of the electric motor model 11b. In this figure, reference numerals 20 to 27 denote the same parts in the first embodiment, and an explanation thereof will be omitted. Reference numerals 18b and 19b denote matrix gains.

The matrix gain 18b outputs a calculation result of the second term of the right side of the equation (20) based on the input voltage commands vd* and vq*. The matrix gain 19b outputs a calculation result of the first term of the right side of the equation (20) based on the input angular frequency w, the input estimated rotational speed wr0, the input estimated currents id0 and iq0, and the input estimated rotor magnetic flux pdr0.

The adder-subtractors 20 to 22 add and subtract the first, second, and third terms of the right side of the equation (20) to output d/dt id0, d/dt iq0, and d/dt pdr0, respectively. The divider 27 outputs a calculation result of the second term of the right side of the equation (21) based on the input e04 and pdr0. The subtractor 23 subtracts the output of the divider 27 from the estimated rotational speed wr0 to output the right side of the equation (21), i.e., the angular frequency w.

With the above configuration, the electric motor model 11b calculates the d-axis estimated current id0 and the q-axis estimated current iq0 on the rotational biaxial coordinates (d-q axis), the d-axis estimated rotor magnetic flux pdr0, and the angular frequency w according to the equations (20) and (21).

According to the second embodiment, as in the first embodiment, the synchronous motor can be controlled at a high rotational speed by an inexpensive computing unit, and the scope of application can be expanded to the synchronous motor having a salient-pole properties.

Third Embodiment:

In the second embodiment, state variables of the adaptive observer 9b are handled as id0, iq0, pdr0, pqr0 (=0). However, the state variables may be handled as pds0, pqs0, pdr0, and pqr0. Reference symbols pds0 and pqs0 denote a d-axis component and a q-axis component of estimated armature reaction on a rotational biaxial coordinates defined by the following equation (31), $$\begin{pmatrix} pds0 \\ pqs0 \end{pmatrix} = \begin{pmatrix} Ld & 0 \\ 0 & Lq \end{pmatrix} \begin{pmatrix} ids0 \\ iqs0 \end{pmatrix} \quad (31)$$

Figure 6:
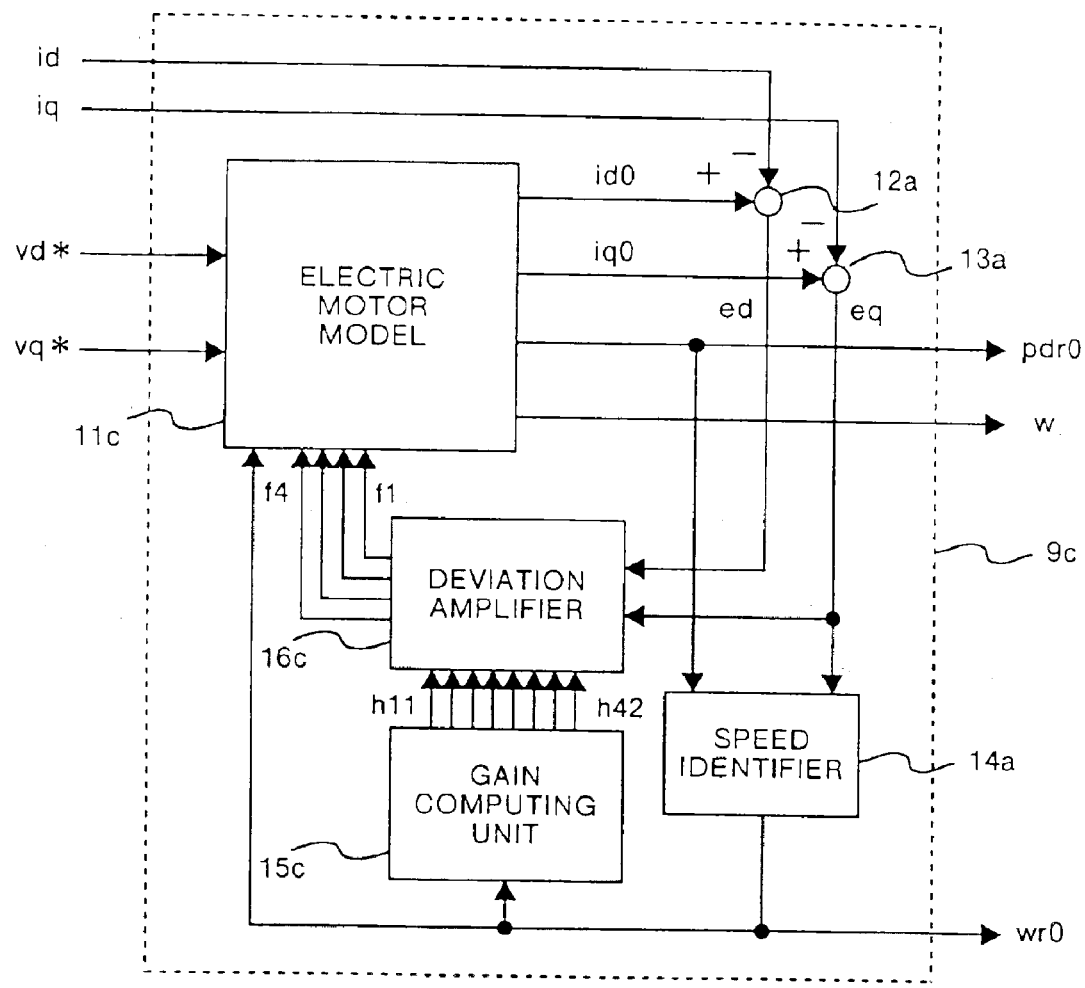
FIG. 6 is a diagram which shows the configuration of an adaptive observer.

When the equation (31) is substituted into the equations (20) to (22), the following equations (32) to (35) are obtained, $$\frac{d}{dt}\begin{pmatrix} pds0 \\ pqs0 \\ pdr0 \end{pmatrix} = \begin{pmatrix} -\frac{R}{Ld} & w & 0 \\ -w & -\frac{R}{Lq} & -wr0 \\ 0 & 0 & 0 \end{pmatrix}\begin{pmatrix} pds0 \\ pqs0 \\ pdr0 \end{pmatrix} + \quad (32)$$

$$\begin{pmatrix} vd* \\ vq* \\ 0 \end{pmatrix} - \begin{pmatrix} f1 \\ f2 \\ f3 \end{pmatrix}$$

$$w = wr0 - \frac{f4}{pdr0} \quad (33)$$

$$\begin{pmatrix} f1 \\ f2 \\ f3 \\ f4 \end{pmatrix} = \begin{pmatrix} h11 & h12 \\ h21 & h22 \\ h31 & h32 \\ h41 & h41 \end{pmatrix} \begin{pmatrix} ed \\ eq \end{pmatrix} \quad (34)$$

$$\begin{pmatrix} id0 \\ iq0 \end{pmatrix} = \begin{pmatrix} \frac{1}{Ld} & 0 & 0 \\ 0 & \frac{1}{Lq} & 0 \end{pmatrix} \begin{pmatrix} pds0 \\ pqs0 \\ pdr0 \end{pmatrix} \quad (35)$$

where $h11 = Ld\ g11, \quad h12 = Ld\ g12$ $h21 = Lq\ g21, \quad h22 = Lq\ g22$ $h31 = g31, \quad h32 = g32$ $h41 = g41, \quad h42 = g42$ The configuration of the third embodiment merely uses an adaptive observer 9c in place of the adaptive observer 9a in FIG. 1. FIG. 6 is a diagram which shows the configuration of the adaptive observer 9c. In FIG. 6, reference numerals 12a, 13a, and 14a denote the same parts in the first and second embodiments, and an explanation thereof will be omitted. Reference numeral 11c denotes an electric motor model, 15c denotes a gain computing unit, and 16c denotes a deviation amplifier.

The electric motor model 11c calculates a d-axis estimated current id0 and a q-axis estimated current iq0 on the rotational biaxial coordinates (d-q axis), a d-axis estimated rotor magnetic flux pdr0, and an angular frequency w according to equations (32) and (33) based on the d-axis voltage command vd* and the q-axis voltage command vq* on the rotational biaxial coordinates (d-q axis), the estimated rotational speed wr0, and deviations f1, f2, f3, and f4 (to be described later).

The gain computing unit 15c outputs gains h11, h12, h21, h22, h31, h32, h41, and h42 based on the estimated rotational speed wr0. The deviation amplifier 16c amplifies the current deviations ed and eq by the gains h11, h12, h21, h22, h31, h32, h41, and h42 to output deviations f1, f2, f3, and f4. More specifically, the deviation amplifier 16c outputs the deviations f1, f2, f3, and f4 to the electric motor model 11c according to the equation (34).

With the above configuration, the adaptive observer 9c outputs the estimated rotor magnetic flux pdr0, the angular frequency w, and the estimated rotational speed wr0.

Figure 7:
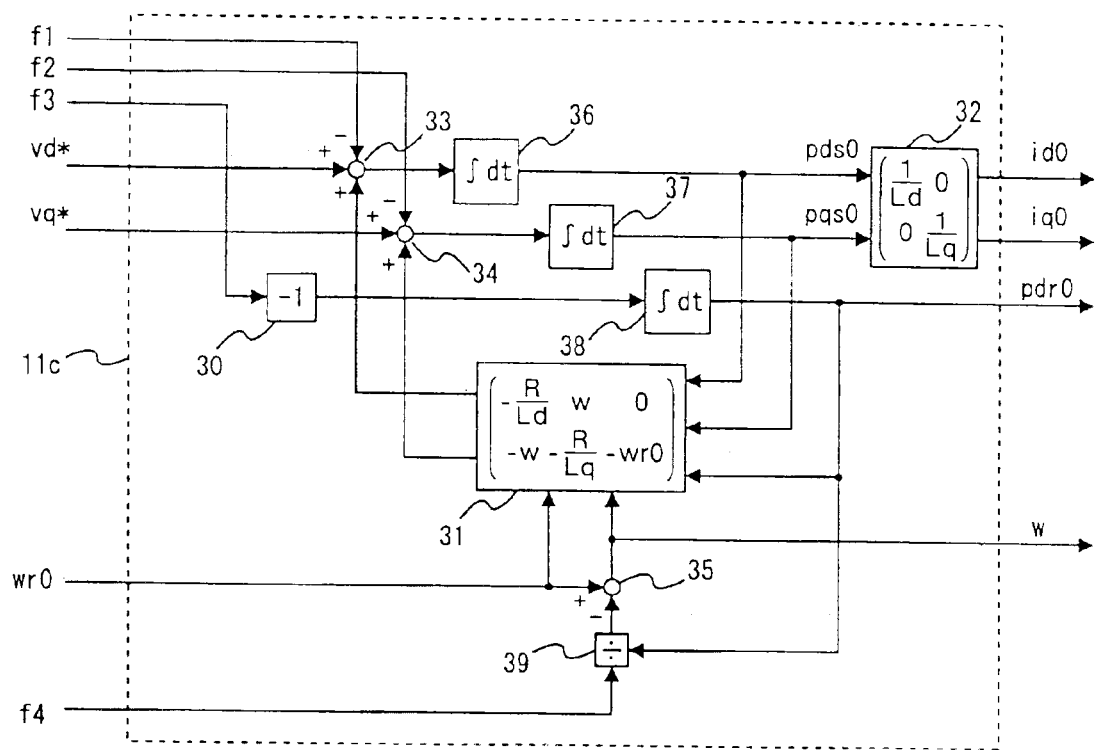
FIG. 7 is a diagram which shows the configuration of an electric motor model.

FIG. 7 is a diagram which shows the configuration of the electric motor model 11c. In this figure, reference numeral 30 denotes a gain, 31 and 32 denote matrix gains, 33 and 34 denote adder-subtractors, 35 denotes a subtractor, 36 to 38 denote integrators, and 39 denotes a divider.

The matrix gain 31 outputs calculation results of the first and second lines of the first term of the right side of the equation (32) based on the input angular frequency w, the input estimated rotational speed wr0, the input estimated armature reactions pds0 and pqs0, and the input estimated rotor magnetic flux pdr0.

The adder-subtractors 33 and 34 add and subtract the second and third lines of the first, second, and third terms of the right side of the equation (32) to output d/dt pds0 and d/dt pqs0, respectively. The gain 30 makes the deviation f3–1 times to calculate the third line of the right side of the equation (32), thereby outputting d/dt pdr0.

The integrators 36 to 38 integrate the d/dt pds0, d/dt pqs0, and d/dt pdr0 to output pds0, pqs0, and pdr0. The matrix gain 32 outputs estimated currents id0 and iq0 according to the equation (35) based on the pds0 and pqs0.

The divider 39 outputs a calculation result of the second term of the right side of the equation (33) based on the input f4 and pdr0. The subtractor 35 subtracts an output of the divider 39 from the estimated rotational speed wr0 to output the right side of the equation (33), i.e., the angular frequency w.

With the above configuration, the electric motor model 11c calculates the d-axis estimated current id0 and the q-axis estimated current iq0 on the rotational biaxial coordinates (d-q axis), the estimated rotor magnetic flux pdr0, and the angular frequency w according to the equations (32), (33), and (35).

Although the third embodiment has state variables which are different from those of the second embodiment, the third embodiment is essentially equivalent to the second embodiment. Therefore, as in the second embodiment, the synchronous motor can be controlled at a high rotational speed even by an inexpensive computing unit. In addition, the scope of application can be expanded to the synchronous motor having salient-pole properties.

Fourth Embodiment:

In the first embodiment, the feedback gains of the adaptive observer are determined to be in proportion to the unique pole of the synchronous motor. However, when the gains g1, g2, g3, and g4 expressed by the equations (6) to (9) in the adaptive observer are determined, and when the synchronous motor is driven at a low rotational speed, the pole of the synchronous motor decreases. Accordingly, the pole of the adaptive observer also decreases. For this reason, the response of an estimated magnetic flux is deteriorated, and the characteristics of the control system itself are also deteriorated. In addition, when an actual rotational speed wr is deviated from the estimated rotational speed wr0, the estimation accuracy of the estimated magnetic flux is deteriorated disadvantageously.

Therefore, the fourth embodiment will explain a method of averaging transmission characteristics between a speed error of the synchronous motor and a magnetic flux estimation error in a frequency area. In a control apparatus for a synchronous motor which uses this method, deterioration in accuracy of magnetic flux estimation caused by the deviation between the actual rotational speed wr and the estimated rotational speed wr0 can be suppressed, and the magnitude of the pole of the observer can be kept at a desired value. For this reason, a rotational speed can be preferably estimated.

The method of designing a gain will be explained below. An equation of the synchronous motor on rotational biaxial coordinates rotated at an arbitrary frequency was described above is given by the following equation, $$\frac{d}{dt}\begin{pmatrix} id \\ iq \\ pdr \\ pqr \end{pmatrix} = \begin{pmatrix} -\frac{R}{L} & w & 0 & \frac{wr}{L} \\ -w & -\frac{R}{L} & -\frac{wr}{L} & 0 \\ 0 & 0 & 0 & w-wr \\ 0 & 0 & -w+wr & 0 \end{pmatrix} \begin{pmatrix} id \\ iq \\ pdr \\ pqr \end{pmatrix} + \begin{pmatrix} \frac{1}{L} & 0 \\ 0 & \frac{1}{L} \\ 0 & 0 \\ 0 & 0 \end{pmatrix} \begin{pmatrix} vd \\ vq \end{pmatrix} \quad (36)$$

Armature reactions pds and pqs are defined by equation. (37). This equation is substituted to the state equation expressed by the equation (36), the following equation (38) is obtained, $$\begin{pmatrix} pds \\ pqs \end{pmatrix} = \begin{pmatrix} L & 0 \\ 0 & L \end{pmatrix} \begin{pmatrix} id \\ iq \end{pmatrix} \tag{37}$$

$$\frac{d}{dt}\begin{pmatrix} pds \\ pqs \\ pdr \\ pqr \end{pmatrix} = \begin{pmatrix} -\frac{R}{L} & w & 0 & wr \\ -w & -\frac{R}{L} & -wr & 0 \\ 0 & 0 & 0 & w-wr \\ 0 & 0 & -w+wr & 0 \end{pmatrix} \begin{pmatrix} pds \\ pqs \\ pdr \\ pqr \end{pmatrix} + \tag{38}$$

$$\begin{pmatrix} pds \\ pqs \\ pdr \\ pqr \end{pmatrix} + \begin{pmatrix} 1 & 0 \\ 0 & 1 \\ 0 & 0 \\ 0 & 0 \end{pmatrix} \begin{pmatrix} vd \\ vq \end{pmatrix}$$

When the rotational speed wr changes by $\Delta wr$, the equation (38) changes as expressed by the following equation (39), $$\frac{d}{dt}\begin{pmatrix} pds \\ pqs \\ pdr \\ pqr \end{pmatrix} = \begin{pmatrix} -\frac{R}{L} & w & 0 & wr+\Delta wr \\ -w & -\frac{R}{L} & -wr-\Delta wr & 0 \\ 0 & 0 & 0 & w-wr-\Delta wr \\ 0 & 0 & -w+wr+\Delta wr & 0 \end{pmatrix} \begin{pmatrix} pds \\ pqs \\ pdr \\ pqr \end{pmatrix} + \tag{39}$$

$$\begin{pmatrix} 1 & 0 \\ 0 & 1 \\ 0 & 0 \\ 0 & 0 \end{pmatrix} \begin{pmatrix} vd \\ vq \end{pmatrix}$$

$$= \begin{pmatrix} -\frac{R}{L} & w & 0 & wr \\ -w & -\frac{R}{L} & -wr & 0 \\ 0 & 0 & 0 & w-wr \\ 0 & 0 & -w+wr & 0 \end{pmatrix} \begin{pmatrix} pds \\ pqs \\ pdr \\ pqr \end{pmatrix} +$$

$$\begin{pmatrix} 1 & 0 \\ 0 & 1 \\ 0 & 0 \\ 0 & 0 \end{pmatrix} \begin{pmatrix} vd \\ vq \end{pmatrix} + \begin{pmatrix} 0 & 1 \\ -1 & 0 \\ 0 & -1 \\ 1 & 0 \end{pmatrix} \Delta wr \begin{pmatrix} pdr \\ pqr \end{pmatrix}$$

$$= \begin{pmatrix} -\frac{R}{L} & w & 0 & wr \\ -w & -\frac{R}{L} & -wr & 0 \\ 0 & 0 & 0 & w-wr \\ 0 & 0 & -w+wr & 0 \end{pmatrix} \begin{pmatrix} pds \\ pqs \\ pdr \\ pqr \end{pmatrix} +$$

$$\begin{pmatrix} 1 & 0 \\ 0 & 1 \\ 0 & 0 \\ 0 & 0 \end{pmatrix} \begin{pmatrix} vd \\ vq \end{pmatrix} + \begin{pmatrix} 0 & 1 \\ -1 & 0 \\ 0 & -1 \\ 1 & 0 \end{pmatrix} \begin{pmatrix} w2d \\ w2q \end{pmatrix}$$

where $\begin{pmatrix} w2d \\ w2q \end{pmatrix} = \begin{pmatrix} \Delta wr \cdot pdr0 \\ \Delta wr \cdot pqr0 \end{pmatrix}$ Therefore, it can be understood that the equation (39) is an equation in which system noise and measurement noise expressed by equation (40) are input as disturbance to an ideal synchronous motor expressed by the equation (38).

$$\text{system noise: } \begin{pmatrix} 0 & 1 \\ -1 & 0 \\ 0 & -1 \\ 1 & 0 \end{pmatrix} \begin{pmatrix} w2d \\ w2q \end{pmatrix} \tag{40}$$

$$\text{measurement noise: } \begin{pmatrix} \varepsilon & 0 \\ 0 & \varepsilon \end{pmatrix} wl$$

Figure 8:
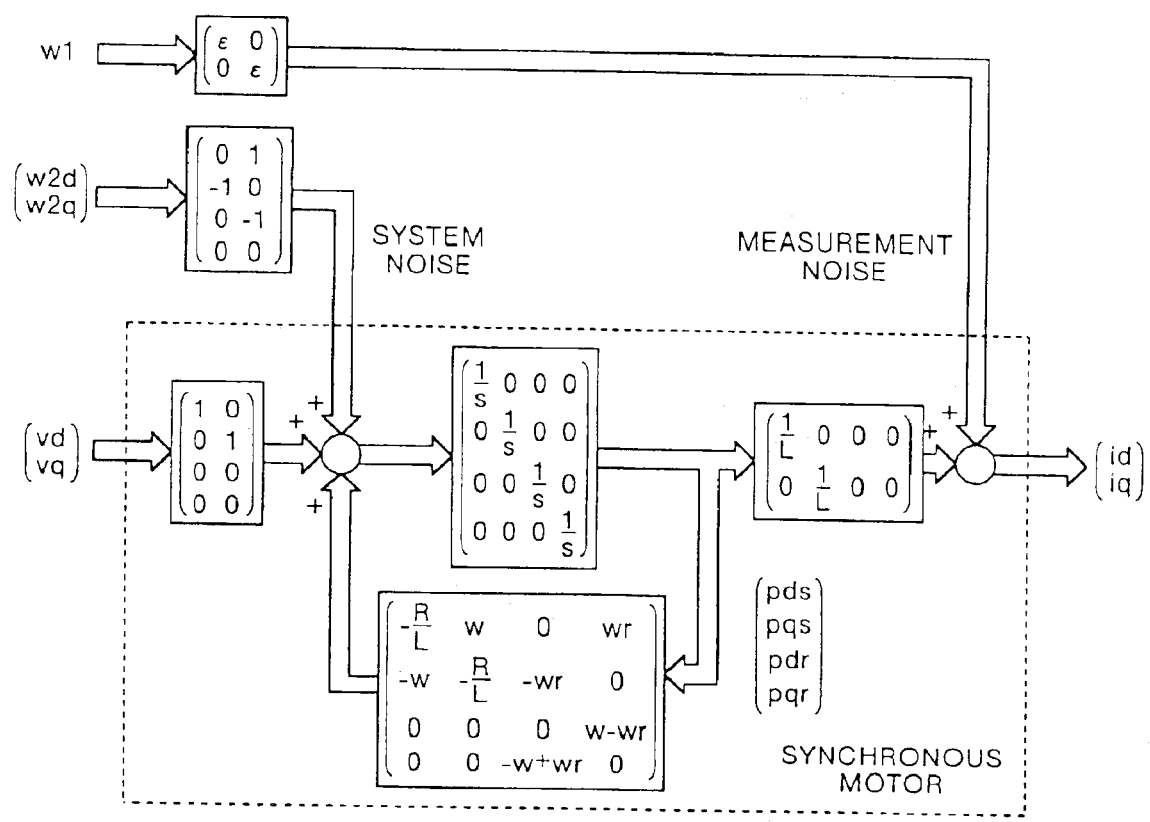
FIG. 8 is a block diagram which shows a synchronous motor when system noise and measurement noise are input as disturbances.

FIG. 8 is a block diagram of the synchronous motor 1 used at this time.

As described above, disturbance occurring when a deviation of $\Delta wr$ is produced between the rotational speed and the estimated rotational speed is stereotyped by the equation (40), and feedback gains h11, h12, h21, h22, h31, h32, h41, and h42 are determined such that transmission matrix gains from the disturbance expressed by the equation (40) to the estimated magnetic flux error are minimum. In this state, even though a deviation is produced between the rotational speed and the estimated rotational speed, an influence to estimation of a rotor magnetic flux caused by the speed deviation can be suppressed.

Matrixes A, C, Q, and R are defined by equations (41), (42), (43), and (44). The matrix A is obtained by substituting w=0 to the first term of the right side of the equation (38), the matrix C includes a magnet flux to a current, the matrix Q is a covariance matrix related to system noise, and the matrix R is a covariance matrix related to measurement noise.

$$A = \begin{pmatrix} -\frac{R}{L} & 0 & 0 & wr \\ 0 & -\frac{R}{L} & -wr & 0 \\ 0 & 0 & 0 & -wr \\ 0 & 0 & wr & 0 \end{pmatrix} \tag{41}$$

$$C = \begin{pmatrix} \frac{1}{L} & 0 & 0 & 0 \\ 0 & \frac{1}{L} & 0 & 0 \end{pmatrix} \tag{42}$$

$$Q = \begin{pmatrix} 0 & 1 \\ -1 & 0 \\ 0 & -1 \\ 1 & 0 \end{pmatrix} \begin{pmatrix} 0 & 1 \\ -1 & 0 \\ 0 & -1 \\ 1 & 0 \end{pmatrix}^T = \begin{pmatrix} 1 & 0 & -1 & 0 \\ 0 & 1 & 0 & -1 \\ -1 & 0 & 1 & 0 \\ 0 & -1 & 0 & 1 \end{pmatrix} \tag{43}$$

$$R = \begin{pmatrix} \varepsilon & 0 \\ 0 & \varepsilon \end{pmatrix} \begin{pmatrix} \varepsilon & 0 \\ 0 & \varepsilon \end{pmatrix}^T = \begin{pmatrix} \varepsilon^2 & 0 \\ 0 & \varepsilon^2 \end{pmatrix} \tag{44}$$

A positive definite unique solution P which satisfies a Riccati equation expressed by the equation (44) is obtained. When the feedback gains h11, h12, h21, h22, h31, h32, h41, and h42 are given by the equation (45), even though a deviation is produced between the rotational speed and the estimated rotational speed, an influence to estimation of a rotor magnetic flux caused by the speed deviation can be suppressed.

$$PA^T + AP - PC^T R^{-1} CP^T + Q = 0 \tag{45}$$

However, since the matrix A includes the rotational speed wr, the feedback gains h11, h12, h21, h22, h31, h32, h41, and h42 are functions of the rotational speeds.

The feedback gains h11, h12, h21, h22, h31, h32, h41, and h42 may be prepared as a table with respect to the respective rotational speeds, and the feedback gains h11, h12, h21, h22, h31, h32, h41, and h42 may be determined as functions of estimated rotational speeds in place of the rotational speeds.

Figure 9:
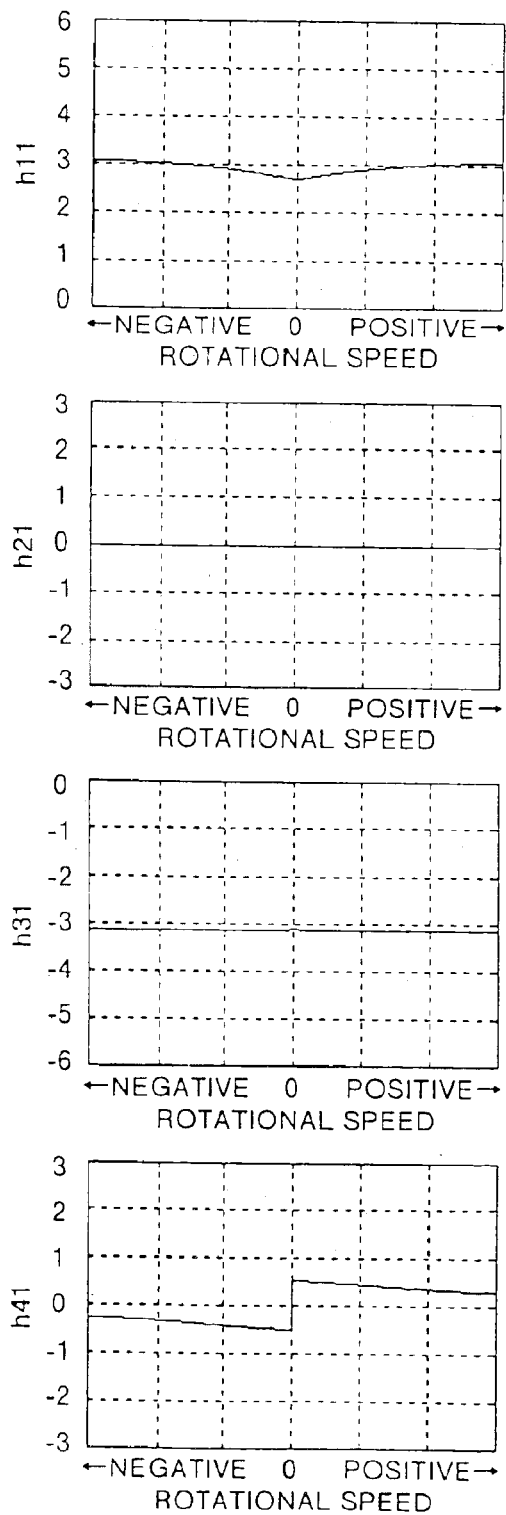
FIG. 9 shows examples of feedback gains h11, h12, h21, h22, h31, h32, h41, and h42 obtained by equation (46)
Figure 9:
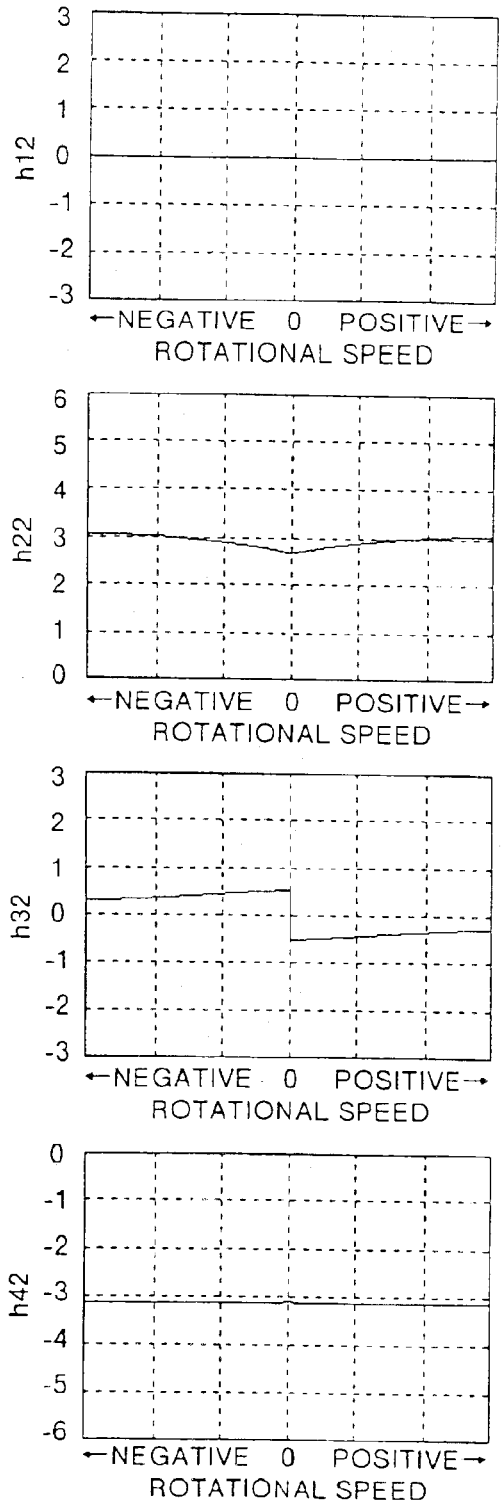

FIG. 9 shows examples of the feedback gains h11, h12, h21, h22, h31, h32, h41, and h42 obtained by giving an appropriate number $\epsilon$ according to equation (46). The relationships shown in FIG. 9 are merely prepared in a gain computing unit as a table. Since the gain computing unit 5 cannot detect an actual rotational speed, the functions of the estimated rotational speeds may be set.

$$\begin{pmatrix} h11 & h12 \\ h21 & h22 \\ h31 & h32 \\ h41 & h42 \end{pmatrix} = PC^T R^{-1} \tag{46}$$

Figure 10:
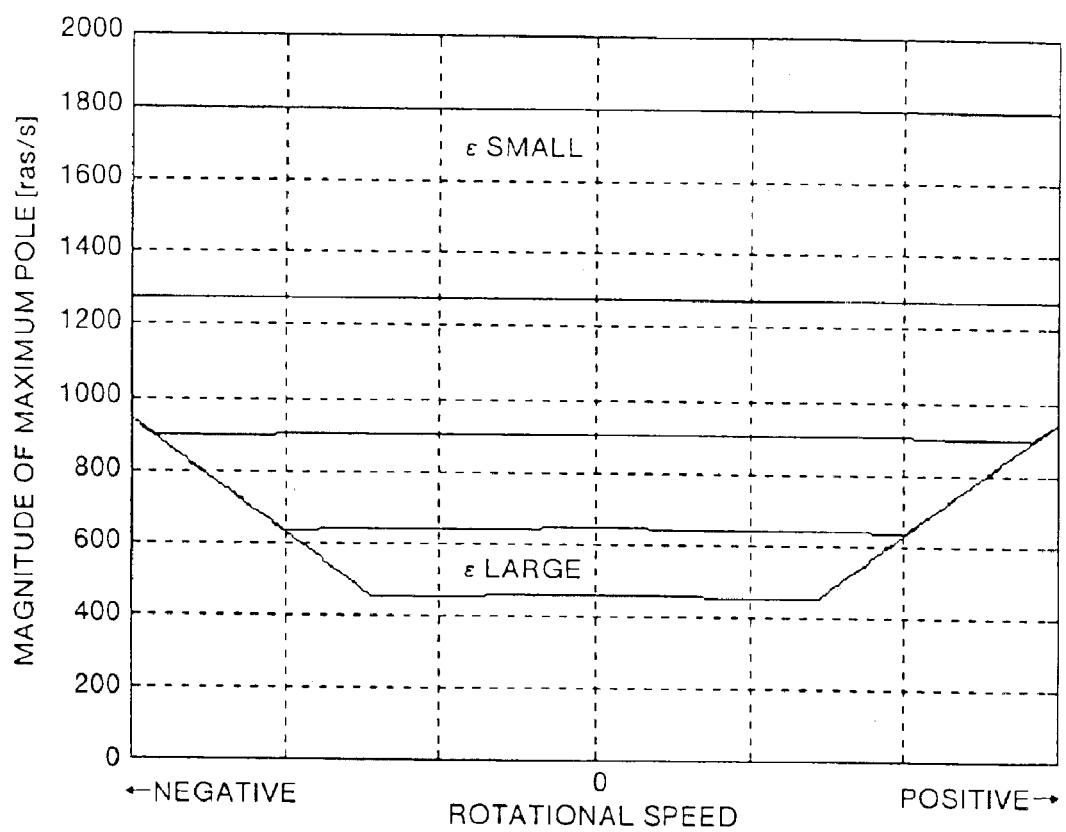
FIG. 10 is a graph on which magnitudes of the maximum pole of the adaptive observer when an arbitrary positive number $\epsilon$ is changed are plotted.

FIG. 10 is a graph on which magnitudes of the maximum pole of the adaptive observer when an arbitrary positive number $\epsilon$ is changed are plotted. As is apparent from FIG. 10, when the magnitude of $\epsilon$ is changed, the magnitude of the maximum pole of the adaptive observer also changes. When this phenomenon is used, the magnitude of the pole of the observer can be determined to be a desired value.

As is apparent from FIG. 9, in a synchronous motor in which a salient-pole ratio is 1 like the first embodiment, equations (47) to (50) are satisfied.

$$h11 = h22 \tag{47}$$
$$h21 = -h12 \tag{48}$$
$$h31 = h42 \tag{49}$$
$$h41 = -h32 \tag{50}$$

In the synchronous motor in which the salient-pole ratio is 1, the equation (37) is satisfied. For this reason, g1 to g4 in the gain computing unit in FIG. 2 are given by equations (51) to (54), transmission matrix gains from the disturbance expressed by the equation (40) to the estimated magnetic flux error can be minimized.

$$g1 = \frac{h11}{L} \tag{51}$$

$$g2 = \frac{h21}{L} \tag{52}$$

$$g3 = h31 \tag{53}$$

$$g4 = h41 \tag{54}$$

According to the fourth embodiment, the pole of the synchronous motor can be arbitrarily set even though the synchronous motor is driven at a low rotational speed, and the gains are appropriate to perform state estimation when the estimated rotational speed is deviated from the actual rotational speed. For this reason, the synchronous motor can be stably controlled without deteriorating the accuracy of magnetic flux estimation.

Fifth Embodiment:

In the fourth embodiment, the control apparatus related to the synchronous motor in which the salient-pole ratio is 1 has been explained. However, the present invention can also be applied to the control apparatus for a synchronous motor in which a salient-pole ratio is not 1 and which is described in the third embodiment.

More specifically, a solution P of the Riccati equation (45) is calculated by using equations (55) and (56) obtained in consideration of a salient-pole ratio without using the equations (41) and (42), and the solution P may be substituted to the equation (46).

$$A = \begin{pmatrix} -\frac{R}{Ld} & 0 & 0 & wr \\ 0 & -\frac{R}{Lq} & -wr & 0 \\ 0 & 0 & 0 & -wr \\ 0 & 0 & wr & 0 \end{pmatrix} \tag{55}$$

$$C = \begin{pmatrix} \frac{1}{Ld} & 0 & 0 & 0 \\ 0 & \frac{1}{Lq} & 0 & 0 \end{pmatrix} \tag{56}$$

Figure 11:
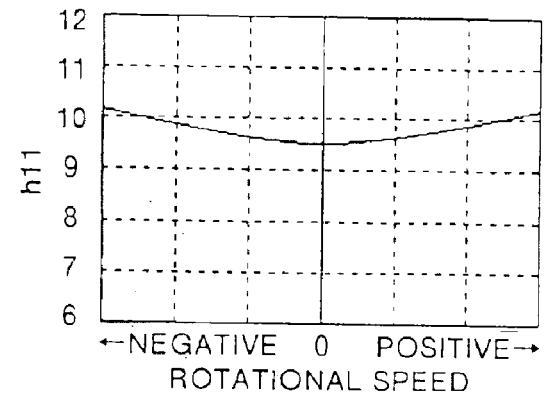
FIG. 11 shows examples of feedback gains h11, h12, h21, h22, h31, h32, h41, and h42 related to a synchronous motor in which a salient-pole ratio is not 1.
Figure 11:
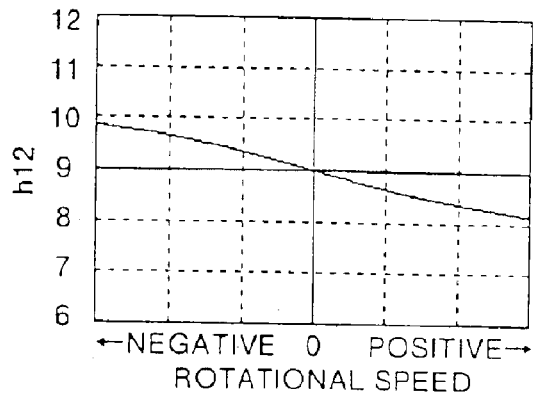
Figure 11:
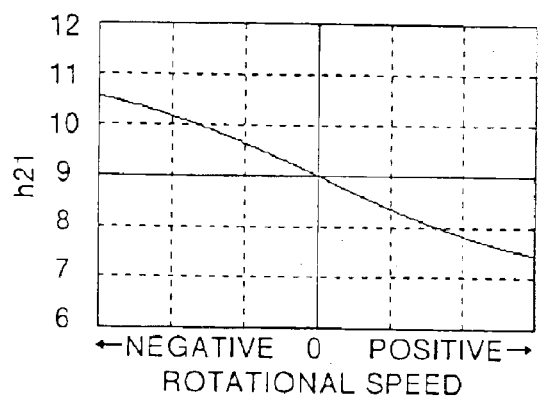
Figure 11:
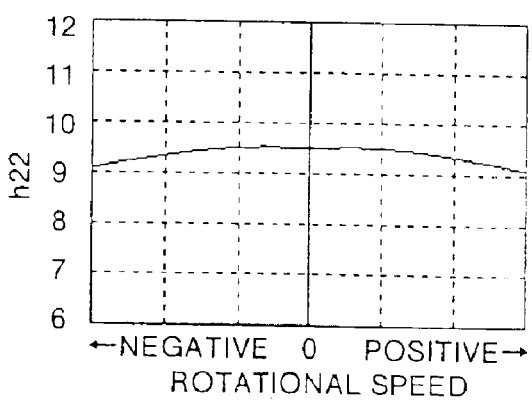
Figure 11:
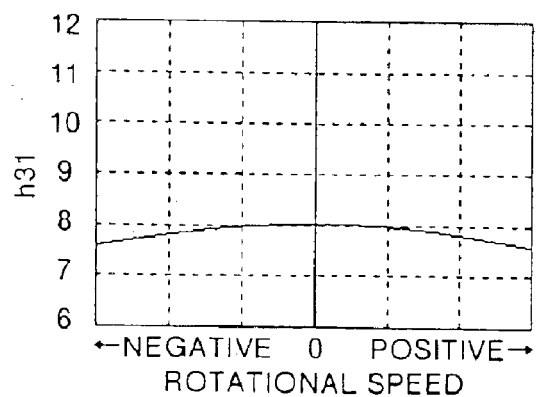
Figure 11:
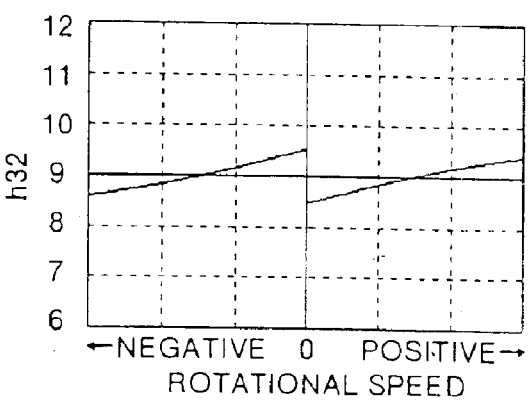
Figure 11:
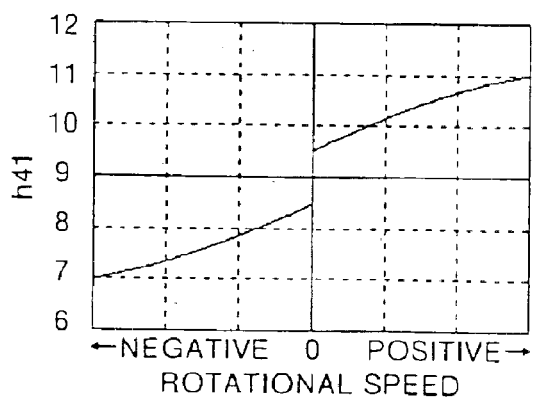
Figure 11:
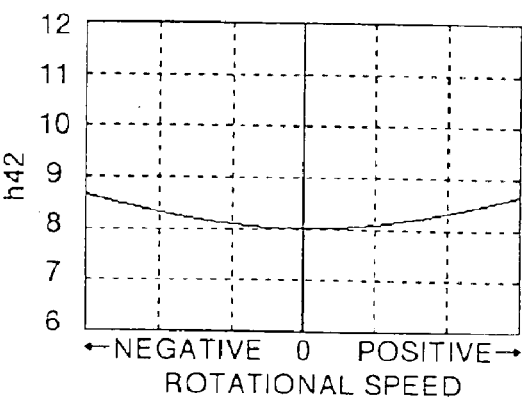

FIG. 11 shows examples of feedback gains h11, h12, h21, h22, h31, h32, h41, and h42 which can be obtained by giving an appropriate number $\epsilon$ according to the equation (46) and which is related to a synchronous motor 1a in which the salient-pole ratio is not 1.

Figure 12:
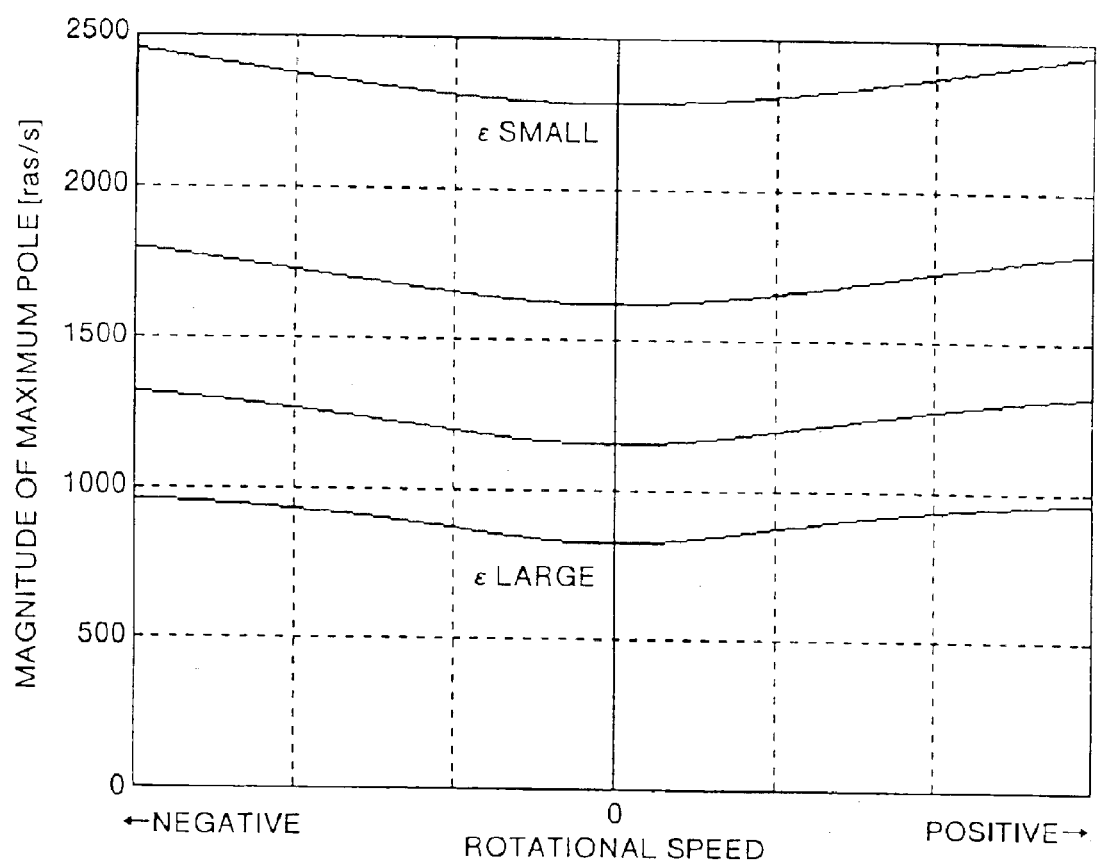
FIG. 12 is a graph on which magnitudes of the pole of an adaptive observer when the positive number s is changed are plotted.

FIG. 12 is a graph on which magnitudes of the maximum pole of an adaptive observer when an arbitrary positive number $\epsilon$ is changed. As is apparent from FIG. 12, when the magnitude of $\epsilon$ is changed, the magnitude of the maximum pole of the adaptive observer also changes. In the configuration of the apparatus, the gain computing unit 15c may be merely replaced with a gain computing unit 15d in FIG. 6 of the fourth embodiment.

Figure 13:
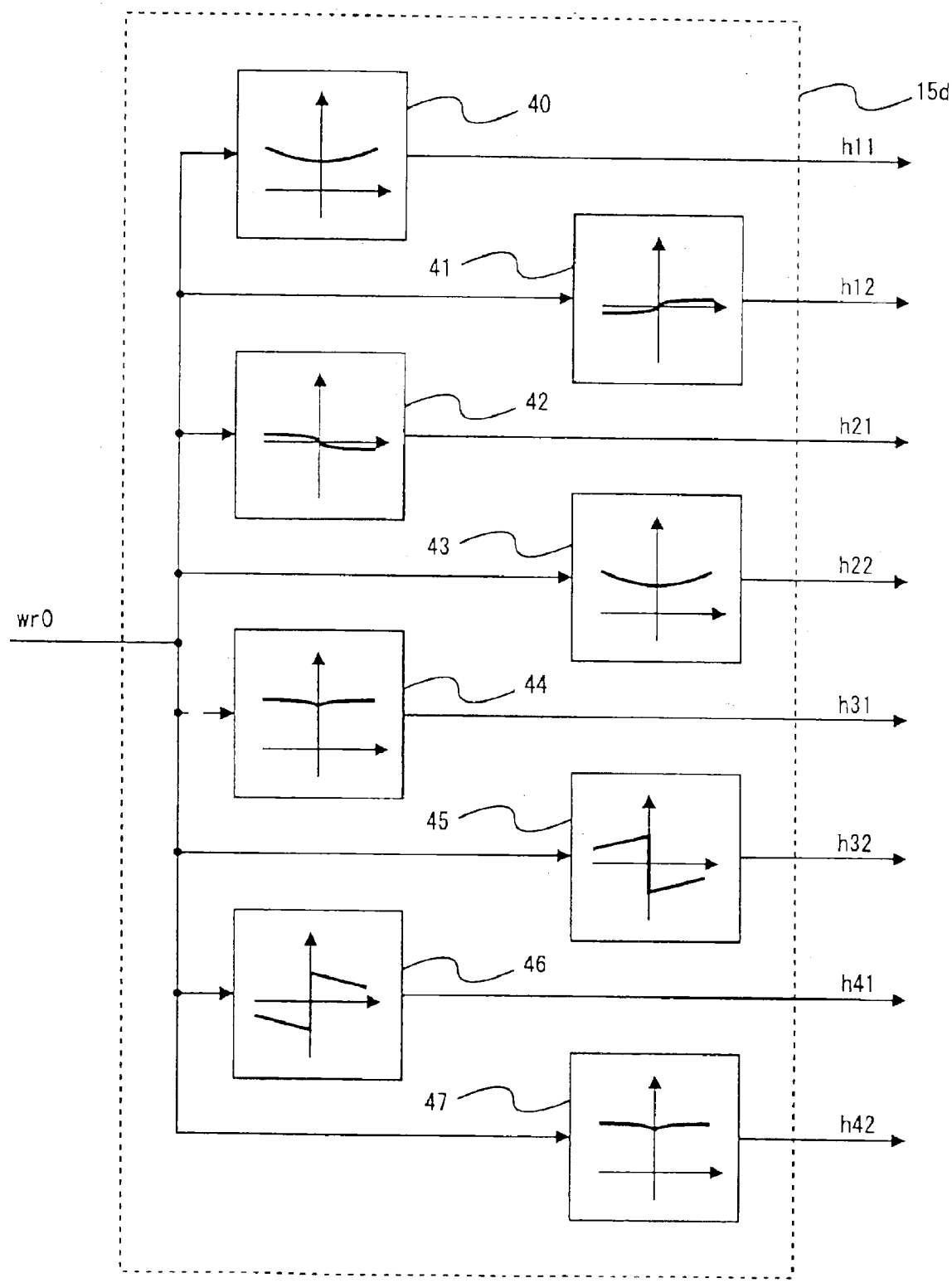
FIG. 13 is a diagram which shows the internal configuration of a gain computing unit.

FIG. 13 is a diagram which shows the internal configuration of the gain computing unit 15d in the fifth embodiment. Reference numerals 40 to 47 denote gain tables. The gain table 40 stores the relation of the feedback gain h11 derived in advance shown in FIG. 11 and outputs the value of the feedback gain h11 based on the input estimated rotational speed wr0. Similarly, the gain tables 41 to 47 store the relations of the feedback gains h12, h21, h22, h31, h32, h41, and h42 derived in advance and shown in FIG. 11, and output the values of the feedback gains h12, h21, h22, h31, h32, h41, and h42 based on the input estimated rotational speed wr0, respectively.

According to this embodiment, even in the synchronous motor in which the salient-pole ratio is not 1 is rotated at a low rotational speed, the pole of the synchronous motor can be arbitrarily set, and gains are appropriate to perform state estimation when an estimated rotational speed is deviated from an actual rotational speed. For this reason, the synchronous motor can be stably controlled without deteriorating the accuracy of magnetic flux estimation.

Sixth Embodiment:

In the above embodiment, although the speed identifier 14 performs calculation based on the equation (18), the right side of the equation (18) may be multiplied and divided by an arbitrary positive number. For example, since the rotor magnetic flux pdr and the estimated rotor magnetic flux pdr0 are positive numbers, the estimated rotational speed wr0 may be given by equation (57) or equation (58) obtained by dividing the equation (18) by pdr0 or (pdr0)^2.

$$wr0 = \left(kp + \frac{ki}{s}\right)\frac{eq}{pdr0} \tag{57}$$

$$wr0 = \left(kp + \frac{ki}{s}\right)eq \tag{58}$$

When the estimated rotational speed wr0 is given by using the equation (58), even though the rotor magnetic flux pdr changes depending on a temperature, an estimation response of a rotational speed can be kept constant. When the estimated rotational speed wr0 is given by using the equation (58), the number of times of multiplication and division required for calculation can be reduced. For this reason, calculation time can be shortened.

Seventh Embodiment:

In the above embodiment, the apparatus which controls a synchronous motor by torque based on a torque command has been explained. However, as is well known, speed control may be performed by using a speed control unit which amplifies a deviation between a rotational speed command and an estimated rotational speed.

Figure 14:
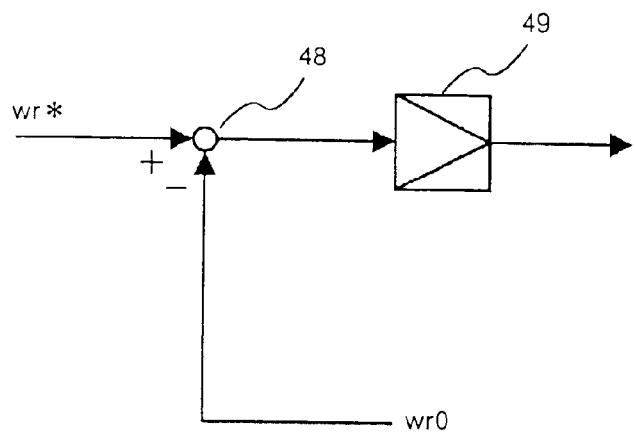
FIG. 14 is a diagram which shows the configuration of a known speed control unit which amplifies a deviation between a rotational speed command and an estimated rotational speed.
Figure 15:
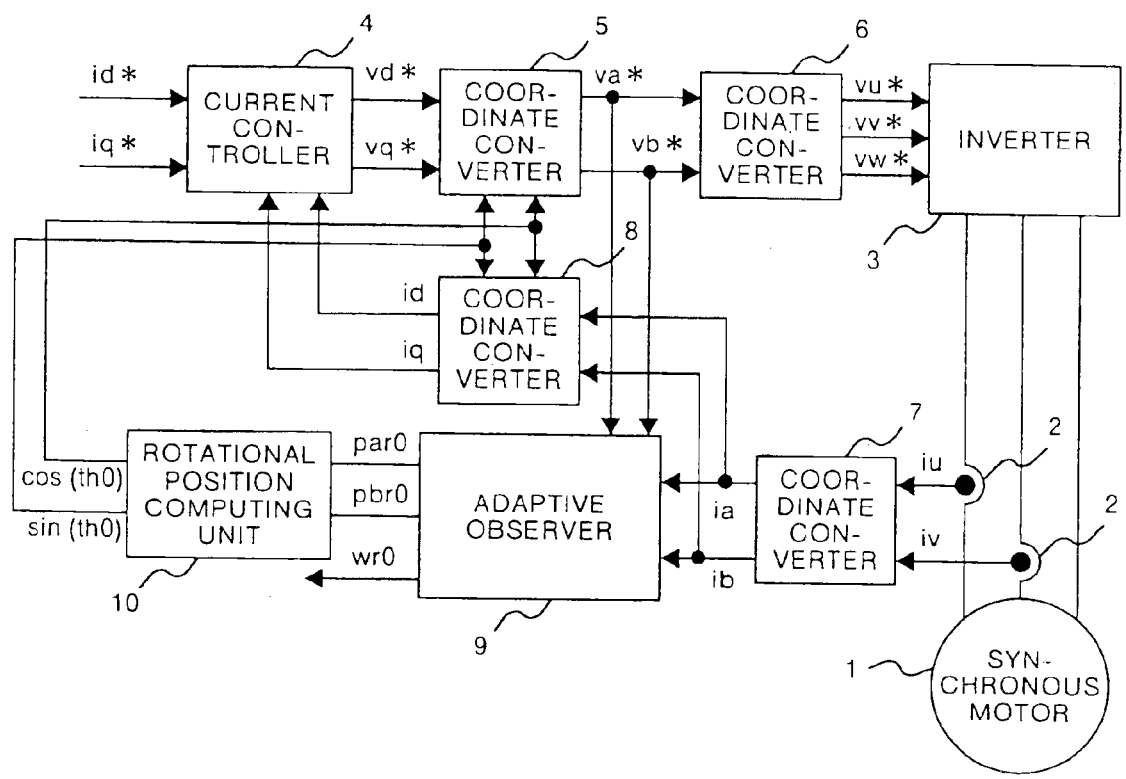
FIG. 15 is a block diagram which shows the entire configuration of a conventional control apparatus for a synchronous motor.
Figure 16:
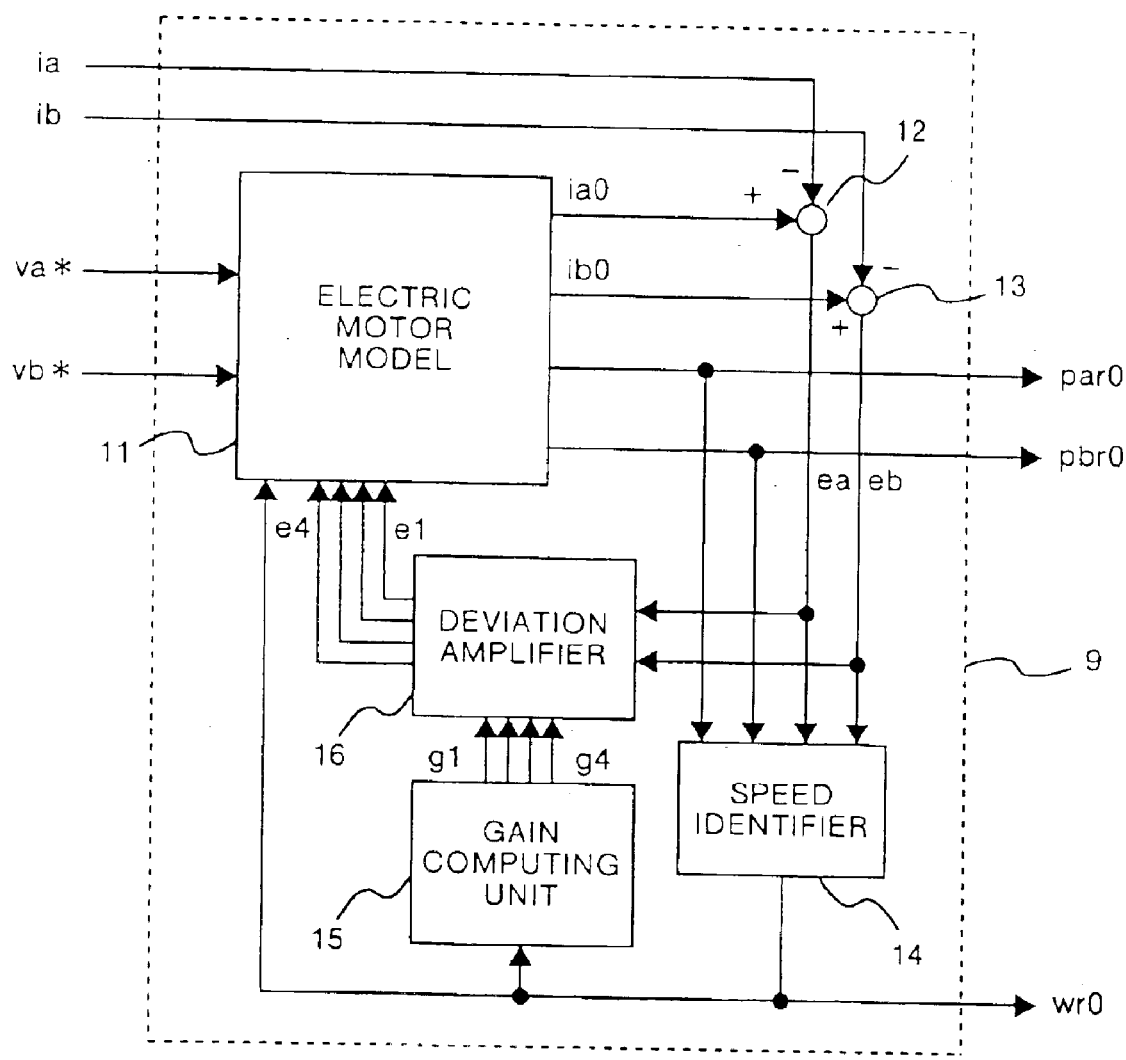
FIG. 16 is a diagram which shows the internal configuration of a conventional adaptive observer.

FIG. 14 is a diagram which shows the configuration of a known speed control unit which amplifies a deviation between a rotational speed command and an estimated rotational speed. In this figure, reference numeral 48 denotes a subtractor, and 49 denotes a speed controller.

The subtractor 48 subtracts an estimated rotational speed wr0 from a rotational speed command wr* and outputs a deviation obtained through the subtraction to the speed controller 49. The speed controller 49 outputs a q-axis current command iq* based on the deviation between the rotational speed command wr* and the estimated rotational speed wr0.

According to the seventh embodiment, the synchronous motor can be controlled in speed. When an angular frequency w is used in place of the estimated rotational speed wr0, the same effect as described above can be obtained.

As has been described above, according to the present invention, the adaptive observer calculates the angular frequency w such that the q-axis component of the estimated rotor magnetic flux is zero, so that the adaptive observer can be constituted on rotational two axes. As a result, even though the synchronous motor operates at a high rotational speed, the frequency components of the voltages vd* and vq* input to the adaptive observer are DC components. For this reason, sampling of the voltages vd* and vq* need not be performed at a very short cycle even though calculation of the adaptive observer is realized by a computing unit. Therefore, the synchronous motor can be controlled at a high rotational speed by an inexpensive computing unit.

According to the next invention, since the adaptive observer has the electric motor model in which the salient-pole ratio is not 1, the synchronous motor can be controlled at a high rotational speed even by an inexpensive computing unit, and the scope of application can be expanded to a synchronous motor having salient-pole properties.

According to the next invention, since the control apparatus includes the adaptive observer which has the feedback gain which is given by the function of the estimated rotational speed such that the transmission characteristics from the rotational speed error of the synchronous motor to the estimated magnetic flux error are averaged in the frequency area, the pole of the synchronous motor can be arbitrary set even if the synchronous motor is driven at a low rotational speed, and the synchronous motor can be stably controlled without deteriorating the accuracy of magnetic flux estimation.

According to the next invention, since the control apparatus includes the adaptive observer which calculates the estimated rotational speed based on the q-axis component of the deviation between the current on the rotational biaxial coordinates (d-q axis) and the estimated current, the number of times of multiplication and division required for calculation can be reduced by omitting a product between the q-axis component of the deviation between the current and the estimated current and an estimated rotor magnetic flux. For this reason, calculation time can be shortened.

According to the next invention, since the control apparatus includes the adaptive observer which calculates the estimated rotational speed based on the value obtained by dividing the q-axis component of the deviation between the current on the rotational biaxial coordinates (d-q axis) and the estimated current by the estimated rotor magnetic flux, even though the rotor magnetic flux changes depending on a temperature, an estimated response of the rotational speed can be kept constant.

According to the next invention, since the control apparatus includes the speed controller which gives the current command on the rotational biaxial coordinates (d-q axis) such that the current command is equal to the rotational speed command based on at least one value of the estimated rotational speed obtained from the adaptive observer and the angular frequency w, the synchronous motor can be controlled in speed.

INDUSTRIAL APPLICABILITY

As has been described above, the control apparatus for a synchronous motor according to the present invention is suitably used as a control apparatus used in various synchronous motors each including an adaptive observer.

What is claimed is:

1. An apparatus for controlling a synchronous motor comprising:

a current detector which detects current of a synchronous motor;

a first coordinate converter which coordinate-converts the current detected by the current detector into a current on rotational biaxial coordinates (d-q axes) rotating at an angular frequency;

a current controller which outputs a voltage command on the rotational biaxial coordinates such that a current on the rotational biaxial coordinates follows a current command on the rotational biaxial coordinates;

a second coordinate converter which the voltage command on the rotational biaxial coordinates obtained from the current controller into three-phase voltage commands;

an adaptive observer which calculates the angular frequency, an estimated current of the synchronous motor, an estimated rotor magnetic flux, and an estimated rotational speed based on the current on the rotational biaxial coordinates and the voltage command on the rotational biaxial coordinates; and an inverter which applies a voltage to the synchronous motor based on the voltage command, wherein the adaptive observer calculates the angular frequency such that a q-axis component of the estimated rotor magnetic flux is zero.

2. The apparatus according to claim 1, comprising a speed controller which outputs a current command on the rotational biaxial coordinates so that the current command is equal to a rotational speed command based on at least one of the estimated rotational speed obtained from the adaptive observer and the angular frequency.

* * * * *